US008787237B2

(12) United States Patent
Väre et al.

(10) Patent No.: US 8,787,237 B2
(45) Date of Patent: Jul. 22, 2014

(54) METHOD AND SYSTEM TO ENABLE HANDOVER IN A HYBRID TERRESTRIAL SATELLITE NETWORK

(75) Inventors: Jani Petteri Väre, Kaarina (FI); Miika Sakari Tupala, Turku (FI)

(73) Assignee: Nokia Corporation, Espoo (FI)

( * ) Notice: Subject to any disclaimer, the term of this patent is extended or adjusted under 35 U.S.C. 154(b) by 168 days.

(21) Appl. No.: 13/297,469

(22) Filed: Nov. 16, 2011

(65) Prior Publication Data

US 2013/0121229 A1 May 16, 2013

(51) Int. Cl.
*H04W 36/00* (2009.01)

(52) U.S. Cl.
USPC .......................................... 370/312; 370/331

(58) Field of Classification Search
None
See application file for complete search history.

(56) References Cited

U.S. PATENT DOCUMENTS

| | | | | |
|---|---|---|---|---|
| 2006/0084435 | A1 | 4/2006 | Borsos et al. | |
| 2007/0045416 | A1 | 3/2007 | Paila et al. | |
| 2007/0123252 | A1* | 5/2007 | Tronc et al. | 455/427 |
| 2007/0173194 | A1* | 7/2007 | Vare et al. | 455/3.04 |
| 2008/0039107 | A1* | 2/2008 | Ma et al. | 455/450 |
| 2008/0225778 | A1 | 9/2008 | Väre et al. | |
| 2009/0077585 | A1 | 3/2009 | Singhai et al. | |
| 2009/0094356 | A1 | 4/2009 | Vare | |
| 2009/0103649 | A1 | 4/2009 | Vare et al. | |
| 2009/0187949 | A1 | 7/2009 | Vare et al. | |
| 2009/0203326 | A1* | 8/2009 | Vesma et al. | 455/69 |
| 2009/0232194 | A1* | 9/2009 | Yoshida | 375/227 |
| 2009/0318151 | A1 | 12/2009 | Jung et al. | |
| 2010/0083311 | A1 | 4/2010 | Väre et al. | |
| 2010/0195633 | A1 | 8/2010 | Vare et al. | |
| 2010/0233962 | A1* | 9/2010 | Johansson et al. | 455/63.1 |
| 2010/0262708 | A1 | 10/2010 | Bouazizi et al. | |
| 2010/0283912 | A1 | 11/2010 | Sun et al. | |
| 2010/0299708 | A1 | 11/2010 | Xu et al. | |
| 2010/0322355 | A1 | 12/2010 | Väre et al. | |
| 2011/0103300 | A1 | 5/2011 | Vare et al. | |
| 2012/0051320 | A1 | 3/2012 | Vare et al. | |
| 2012/0288031 | A1 | 11/2012 | Vare et al. | |

FOREIGN PATENT DOCUMENTS

| | | |
|---|---|---|
| EP | 2134093 | 12/2009 |
| EP | 2154810 | 2/2010 |
| EP | 2200302 | 6/2010 |
| EP | 2207293 | 7/2010 |
| EP | 2268004 | 12/2010 |
| WO | 2011087507 | 7/2011 |

OTHER PUBLICATIONS

International Search Report and Written Opinion for PCT/FI2012/050391 dated Oct. 4, 2012.

(Continued)

*Primary Examiner* — Chirag Shah
*Assistant Examiner* — Rina Pancholi
(74) *Attorney, Agent, or Firm* — Banner & Witcoff, Ltd.

(57) ABSTRACT

A hybrid satellite/terrestrial wireless network having a plurality of terrestrial cells and satellite coverage areas is disclosed. A multiplex transmitted in a terrestrial cell may include signaling information for neighboring terrestrial cells and neighboring satellite coverage areas. The signaling information may include indicators identifying different profiles for the hybrid satellite/terrestrial network, and include other information enabling handover from the terrestrial cell multiplex to one of the neighboring terrestrial or satellite multiplexes.

16 Claims, 17 Drawing Sheets

(56) References Cited

OTHER PUBLICATIONS

Paila, et al., “FLUTE—File Delivery over Unidirectional Transport”, RFC 3926, Oct. 2004, <http://www.ietf.org/rfc/rfc3926.txt>, 33 pages.
Luby, et al., “Asynchronous Layered Coding (ALC) Protocol Instantiation”, RFC 3450, Dec. 2002, <http://www.ietf.org/rfc/rfc3450.txt., 32 pages.
Luby, et al., “Layered Coding Transport (LCT) Building Block”, RFC 3451, Dec. 2002, <http://www.ietf.org/rfc/rfc3451.txt>, 28 pages.
““Multimedia Broadcast/Multicast Service (MBMS); Protocols and codecs”, 3rd Generation PartnershipProject, Technical Specification 3GPP TS 26.346 Release 8, <http://www.3gpp.org/ftp/Specs/>, 2 pages, Aug. 2008.”
International Search Report and Written Opinion for PCT/FI2012/050521 dated Oct. 15, 2012.
ETSI TS 102 471 V1.4.1, “Digital Video Broadcasting(DVB) IP Datacast over DVB-H: Electronic Service Guide (ESG),” 139 pages, Mar. 2010.
International Search Report and Written Opinion for PCT/FI2012/050756 mailed Nov. 13, 2012.
ETSI EN 300 468 (DVB SI), V1.11.1, Digital Video Broadcasting (DVB); Specification for Service Information (SI) in DVB Systems, Apr. 2010.
Faria, et al., DVB-H: Digital Broadcasting Services to Handheld Devices, Proceedings of the IEEE, vol. 94, No. 1, pp. 184-209, Jan. 2006.
Xiadong, et al., A Survey of Handover Algorithms in DVB-H, IEEE Communications Surveys & Tutorials, vol. 8, No. 44, pp. 16-29, 4th Quarter 2006.
International Search Report of PCT/FI2011/050680 dated Oct. 20, 2011.
Digital Video Broadcasting (DVB); Frame structure channel coding and modulation for a second generation digital terrestrial television broadcasting system (DVB-T2), ETSI EN 302 755 v1.1.1 (Sep. 2009), European Standard (Telecommunications series).
Digital Video Broadcasting (DVB); Transmission System for Handheld Terminals (DVB-H), ETSI EN 302 304 v1.1.1 (Nov. 2004), European Standard (Telecommunications series).
Digital Video Broadcasting (DVB); DVB specification for data broadcasting, ETSI EN 301 192 v1.5.1 (Nov. 2009), European Standard (Telecommunications series).
Digital Video Broadcasting (DVB); Framing structure, channel coding and modulation for digital terrestrial television, ETSI EN 300 744 v1.6.1 (Jan. 2009), European Standard (Telecommunications series).
Commercial Requirements for DVB-NGH DVB CM-NGH, Version 1.01.
OMA-TS-BCAST Service Guide for Mobile Broadcast Services, Candidate Version 1.1—Sep. 14, 2010, 302 pages.
Handley, et al., “SDP—Session Description Protocol”, IETF RFC 4566, Jul. 2006, <http://www.ietf.org/rfc/rfc4566.txt>, 46 pages.

* cited by examiner

506

```
mux information section() {                       bits
        NGH_system_id                              16
        cell_id                                    16
        number_RF                                  3
        for (i=0; i<number_RF; i++) {
            RF_id                                  3
            bandwidth                              4
            transmission_mode                      3
            guard_interval                         4
            common_clock_reference_id
            in_band_flag                           1
            if (in_band_flag){
                ngh_slot_length                    12
                ngh_slot_interval                  24
            }
        }
        number_of_LNC                              3
        for (i=0; i<number_of_LNC; i++){
            RF_main;                               3
      nof_PLP;                                     8
            for (j=0; j<nof_PLP; j++){
                PLP_id;                            8
            }
        }
}
```

FIG. 5C

508

| Syntax | bits |
|---|---|
| sat_mux_information_section () { | |
| number_of_frequencies | 4 |
| for (i=0; i<number_of_frequencies; i++) { | |
| frequency | 32 |
| orbital_position | 16 |
| west_east_flag | 1 |
| polarization | 2 |
| satellite_profile | 2 |
| bandwidth | 5 |
| preamble_type | 1 |
| FFT_size | 3 |
| guard_interval | 3 |
| pilot_pattern | 3 |
| frame_synch_offset | 2 |
| number_of_components | 4 |
| for (if=0;i<number_of_components; i++) { | |
| COMPONENT_ID | 8 |
| PLP_ID | 16 |
| } | |
| } | |
| } | |

FIG. 5D

510

| Syntax | bits |
|---|---|
| sat_mux_information_section () { | |
| number_of_frequencies | 8 |
| for (i=0; i<number_of_frequencies; i++) { | |
| frequency | 32 |
| orbital_position | 16 |
| west_east_flag | 1 |
| polarization | 2 |
| satellite_profile | 2 |
| if (satellite_profile == '01') { | |
| preamble_type | 1 |
| bandwidth | 1 |
| FFT_size | 1 |
| guard_interval | 2 |
| pilot_pattern | 3 |
| } elseif (satellite_profile == '10') { | (8) |
| bandwidth | 1 |
| FFT_size | 2 |
| guard_interval | 1 |
| } else { | (4) |
| preamble_type | 1 |
| bandwidth | 5 |
| FFT_size | 3 |
| guard_interval | 3 |
| pilot_pattern | 3 |
| } | (15) |
| frame_synch_offset | 2 |
| number_of_components | 4 |
| for (if=0;i<number_of_components; i++) { | |
| COMPONENT_ID | 8 |
| PLP_ID | 16 |
| } | |
| } | |
| } | |

FIG. 5E

512

| Syntax | bits |
|---|---|
| sat_mux_information_section () { | |
| number_of_frequencies | 4 |
| for (i=0; i<number_of_frequencies; i++) { | |
| frequency | 32 |
| orbital_position | 16 |
| west_east_flag | 1 |
| polarization | 2 |
| satellite_profile | 1 |
| bandwidth | 1 |
| preamble_type | 1 |
| FFT_size | 2 |
| guard_interval | 2 |
| if (satellite_profile = '0'){ | |
| preamble_type | 1 |
| pilot_pattern | 3 |
| } | |
| frame_synch_offset | 2 |
| number_of_components | 4 |
| for (if=0;i<number_of_components; i++) { | |
| COMPONENT_ID | 8 |
| PLP_ID | 16 |
| } | |
| } | |
| } | |

FIG. 5F

METHOD AND SYSTEM TO ENABLE HANDOVER IN A HYBRID TERRESTRIAL SATELLITE NETWORK

BACKGROUND

Communication networks, such as digital broadcast networks, enable end users with electronic devices to receive digital content from various service and content providers. To communicate services and content, the network may use various standards, such as those developed by the Digital Video Broadcast (DVB) Project, which implement a layered protocol stack such as the one described by the Open Systems Interconnection (OSI) Reference Model. Within the network protocol, transport streams may be defined to encapsulate individual components of programs or other services. Such components may include, for example, audio, video, or text components of a program or service. The network may also carry a service guide (SG), which describes for users the services and content available for subscription or purchase.

Within the communication network, digital content can be transmitted in a cell, which is a geographical area covered by a terrestrial transmitter. A cellular network may have multiple cells and cells may be adjacent to other cells. When a device moves between cells, a handover procedure may be initiated. Performing a handover may allow for an electronic device to continue receiving services or programs from the communication network in a neighboring cell.

The same digital content may also be transmitted from a satellite over a satellite coverage area, which may overlap or be adjacent to the cellular network. In some circumstances, it may be desirable to perform a handover to the satellite-transmitted signal when the electronic device moves into a satellite coverage area. However, the electronic device in a cellular network may not be aware of the satellite signal and/or may not have the required signaling information to perform the handover.

BRIEF SUMMARY

This Summary is provided to introduce a selection of concepts in a simplified form that are further described below in the Detailed Description. This Summary is not intended to identify key features or essential features of the various embodiments, nor is it intended to be used to limit the scope of the claims.

Embodiments include a hybrid satellite/terrestrial wireless network having a plurality of terrestrial cells and satellite coverage areas. A multiplex transmitted in a terrestrial cell or satellite coverage area may include signaling information for neighboring terrestrial cells and neighboring satellite coverage areas. A multiplex may comprise a plurality of services, service components, and/or signaling information multiplexed in the same broadcast transmission. Examples of such multiplex may include multiplexing of MPEG-2 transport steams (TS) or elementary streams (ES), Generic Encapsulated Stream (GSE), or internet protocol (IP) data.

In some variations, the signaling information may include indicators identifying different profiles for the hybrid satellite/terrestrial network, and may include other information enabling handover from a terrestrial cell multiplex or satellite multiplex to one of the neighboring terrestrial or satellite multiplexes.

Some aspects include apparatuses, methods, and computer readable media for receiving the multiplexes, decoding the signaling information for neighboring terrestrial and satellite multiplexes, and performing a handover to one of the neighboring multiplexes based on the signaling information.

Other aspects may include apparatuses, methods, and computer readable media for generating the signaling information, and causing transmission of the generated information to a receiving device.

BRIEF DESCRIPTION OF THE DRAWINGS

Certain embodiments are illustrated by way of example and not limited in the accompanying figures in which like reference numerals indicate similar elements and in which:

FIGS. 5A-5F depict example signaling structures for upper level and layer 2 signaling data in accordance with various example embodiments.

DETAILED DESCRIPTION

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1A:
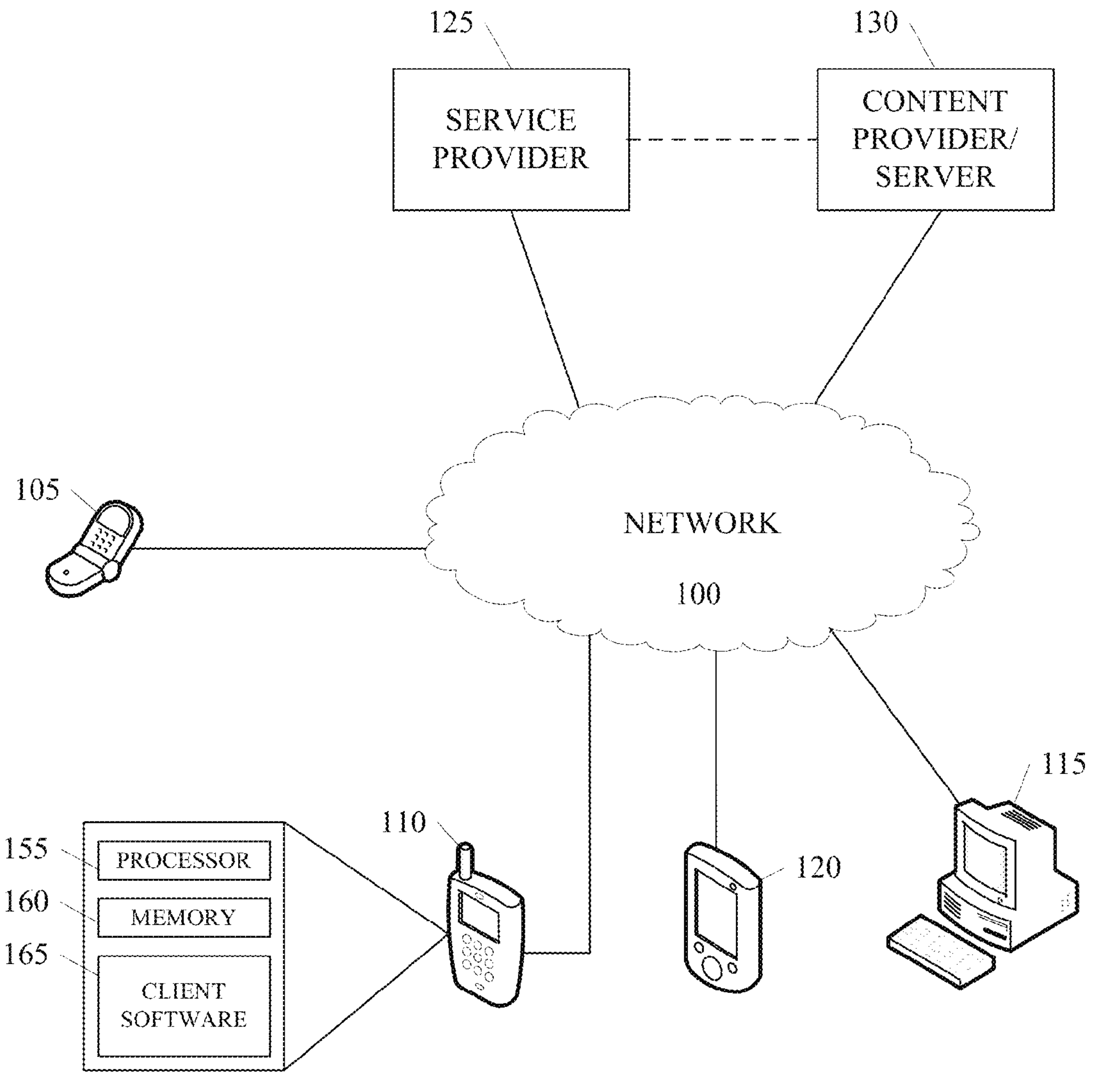
FIG. 1A is a block diagram of an example communication system in which one or more embodiments may be implemented.
Figure 1B:
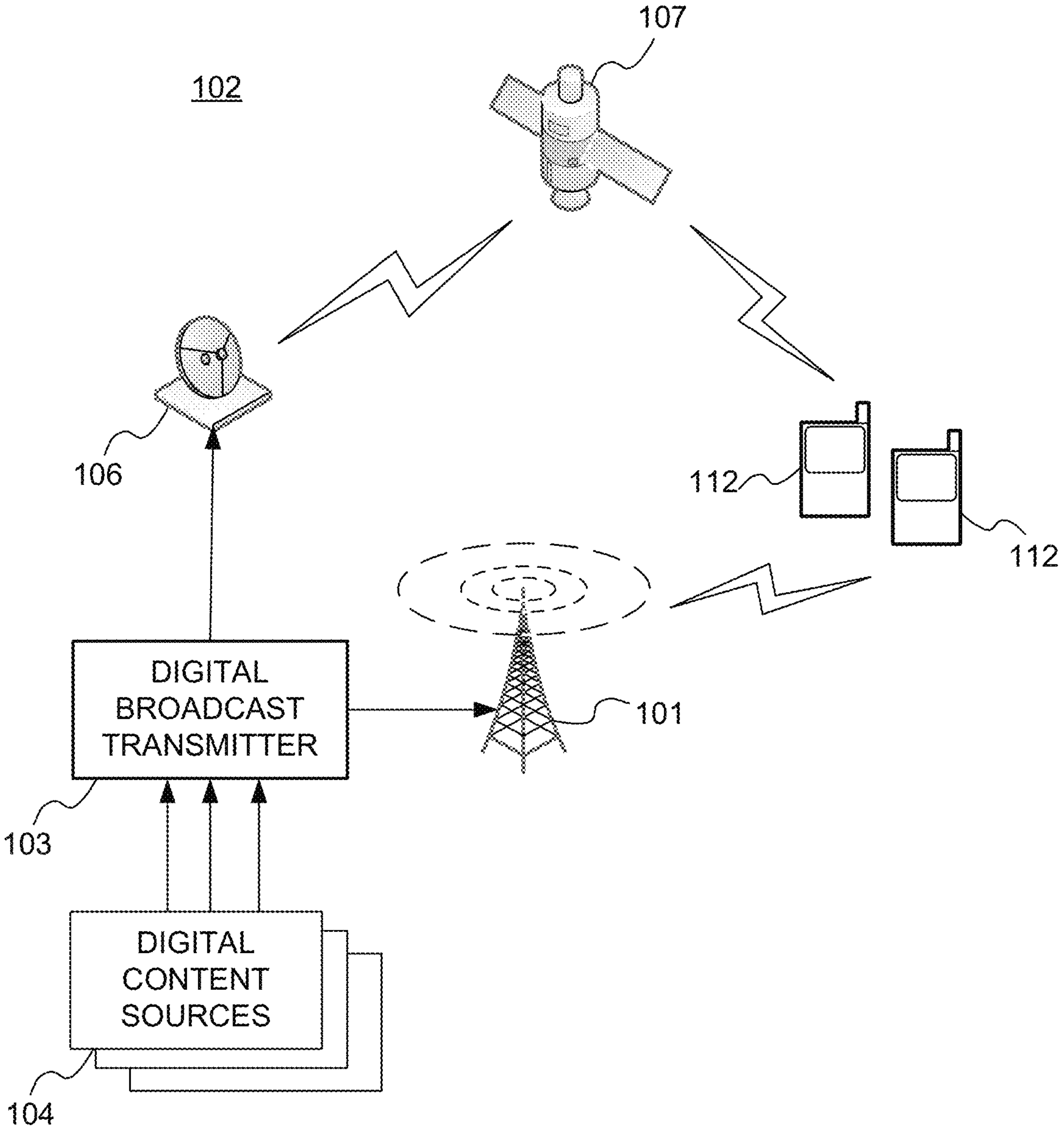
FIG. 1B is a block diagram of another example communication system in which one or more embodiments may be implemented.

FIGS. 1A and 1B illustrate an example communication system through which various embodiments may be practiced. Systems, such as the systems illustrated in FIGS. 1A and 1B, may utilize a digital broadband broadcast technology, such as Digital Video Broadcast—Next Generation Handheld (DVB-NGH). Examples of other digital broadcast technology with which digital broadband broadcast systems may comply include, without limitation, Digital Video Broadcast—Terrestrial (DVB-T), Digital Video Broadcast—Second Generation Terrestrial (DVB-T2), Digital Video Broadcast—Handheld (DVB-H), Digital Video Broadcast—Satellite (DVB-S), Digital Video Broadcast—Satellite2 (DVB-S2), Integrated Services Digital Broadcasting—Terrestrial (ISDB-T), Advanced Television Systems Committee (ATSC) Data Broadcast Standard, Advanced Television Systems Committee—Mobile/Handheld (ATSC-M/H), Digital Multimedia Broadcast-Terrestrial (DMB-T), Terrestrial Digital Multimedia Broadcasting (T-DMB), Terrestrial Digital Audio Broadcasting (T-DAB), Satellite Digital Multimedia Broadcasting (S-DMB), Terrestrial/Satellite Digital Multimedia Broadcasting (T/S-DMB), Forward Link Only (FLO), Digital Audio Broadcasting (DAB), and Digital Radio Mondiale (DRM). Other digital broadcasting standards and techniques, now known or later developed, may also be used. Embodiments of the invention may also be applicable to other systems such 3GPP MBMS (Multimedia Broadcast/Multicast Services) and 3GPP2 BCMCS (Broadcast/Multicast Service).

As seen in FIG. 1A, the system may include a number of computers and electronic devices, including mobile communication device 105, mobile phone 110, personal digital assistant (PDA) or mobile computer 120, computer work station (for example, personal computer (PC)) 115, service provider 125 and content provider/server 130. The various devices in the system may communicate with one another and with other devices through one or more networks 100. Networks 100 may include wired and wireless connections and network elements, and connections over the networks may include permanent or temporary connections. Communication through networks 100 is not limited to the illustrated devices and may include additional mobile or fixed devices. Such additional mobile or fixed devices may include a video storage system, an audio/video player, a digital camera/camcorder, a positioning device such as a GPS (Global Positioning System) device or satellite, a television, an audio/video player, a tablet computer, a radio broadcasting receiver, a set-top box (STB), a digital video recorder, remote control devices and the like.

Although shown as a single network in FIG. 1A for simplicity, network 100 may include multiple networks that are interlinked so as to provide internetworked communications. Such networks may include one or more private or public packet-switched networks, for example the Internet, one or more private or public circuit-switched networks, for example a public switched telephone network, a satellite network, and/or a cellular network configured to facilitate communications to and from mobile communication devices 105 and 110. Communications in network 100 may be achieved, for example through use of base stations, mobile switching centers, satellite dishes/transponders, etc., a short or medium range wireless communication connection, for example Bluetooth®, ultra wideband (UWB), infrared, WiBree, a wireless local area network (WLAN) according to one or more versions of Institute of Electrical and Electronics Engineers (IEEE) standard no. 802.11, a high-speed wireless data network such as an Evolution-Data Optimized (EV-DO) network, a Universal Mobile Telecommunications System (UMTS) network, a Long Term Evolution (LTE) network, and/or Enhanced Data rates for GSM Evolution (EDGE) networks. Devices 105-120 may use various communication protocols such as Internet Protocol (IP), Transmission Control Protocol (TCP), and Simple Mail Transfer Protocol (SMTP) among others known in the art. Various messaging services such as Short Messaging Service (SMS) and/or Multimedia Message Service (MMS) may also be included.

Devices 105-120 may be configured to interact with each other or other devices, such as content provider/server 130 or service provider server 125. In one example, devices 105, 110, 115, and 120 may include client software 165 that is configured to coordinate the transmission and reception of information to and from content provider/server 130. In one arrangement, client software 165 may include application or server specific protocols for requesting and receiving content from content provider/server 130. For example, client software 165 may comprise a web browser or mobile variants thereof and content provider/server 130 may comprise a web server. Billing services (not shown) may also be included to charge access or data fees for services rendered. In one arrangement where service provider 125 provides cellular, satellite, and/or wireless network access, client software 165 may include instructions for access and communication through the cellular, satellite and/or wireless network. Client software 165 may be stored in computer-readable memory 160 such as read only, random access memory, writeable and rewriteable media and removable media in device 110 and may include instructions that cause one or more components—for example, processor 155, a transceiver, and a display—of devices 105/110/115/120 to perform various functions and methods including those described herein.

FIG. 1B illustrates another example communication system 102 through which various embodiments may be practiced. Digital content may be created and/or provided by digital content sources 104 and may include video signals, audio signals, data, and so forth. Digital content sources 104 may provide content to digital broadcast transmitter 103 in the form of digital packets, for example, Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to transmitter 101 (for example, a digital broadcast tower) for terrestrial wireless transmission, or passed to a satellite transponder/dish 106 for communication to satellite 107 for satellite wireless transmission.

Ultimately, mobile terminals or devices 112 may selectively receive and consume digital content originating from digital content sources 104, via one or more terrestrial or satellite transmissions. Communication over the communication network may be unidirectional or bi-directional, with mobile terminals or devices 112 selectively transmitting digital content to other mobile terminals or devices 112, to digital content sources 104, or to other devices configured to receive digital content through the communication network (for example, via tower 101 and/or satellite link 107). Devices 112 may be the same or similar to devices 105, 110, 115, and 120 in FIG. 1A.

Figure 1C:
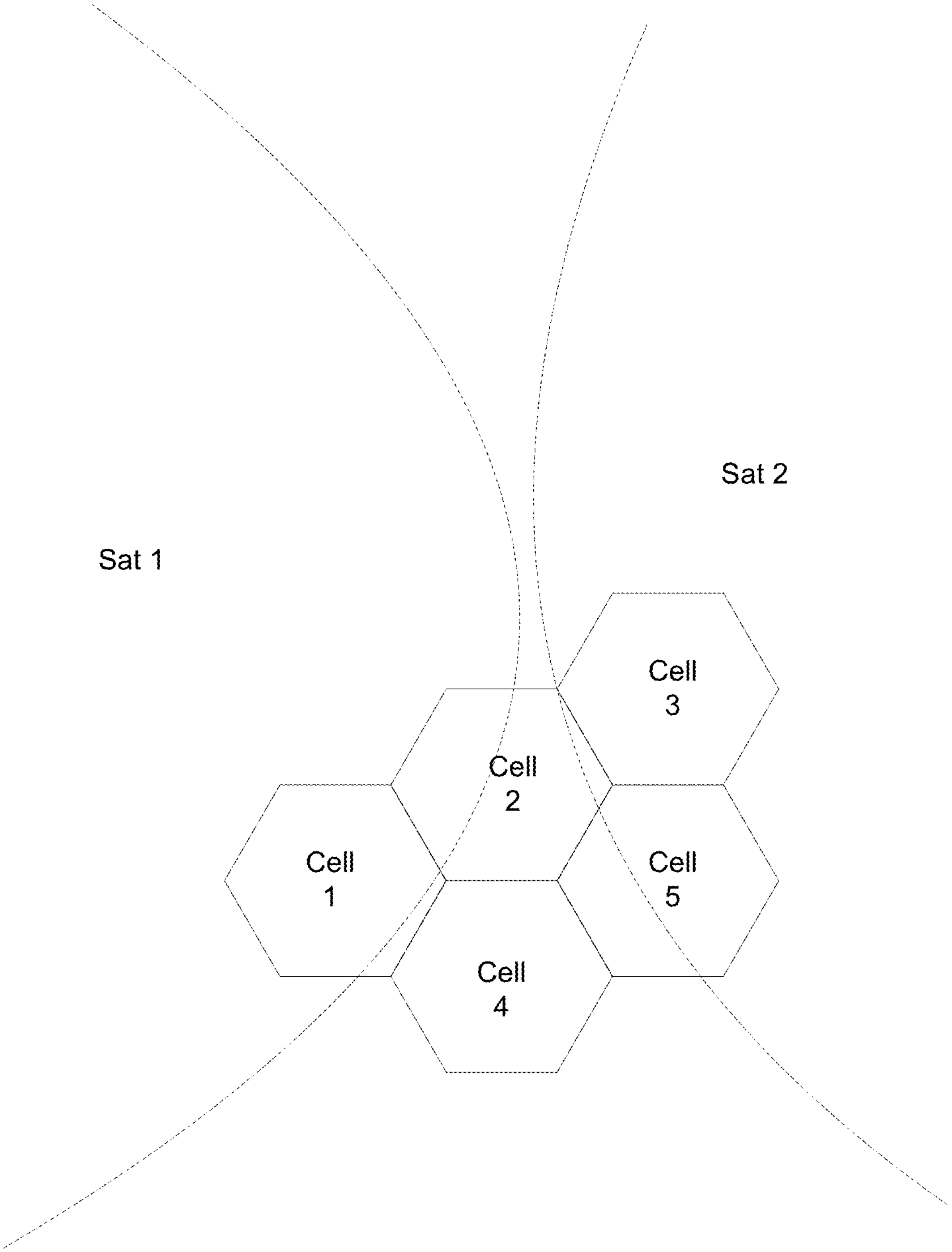
FIG. 1C illustrates an example of network geographical coverage in accordance with one or more embodiments described herein.

A communication system may be comprised of a plurality of communication coverage areas. FIG. 1C illustrates example coverage areas in the form of cells, each of which may be covered by one or more different terrestrial based transceivers (for example, 101). A cell may define a geographical area in which one or more transceivers supports communication with one or more devices, such as devices 105, 110, 112, 115, and 120 in FIGS. 1A and 1B. A cell may be of any size and may have neighboring cells. In the example of FIG. 1C, Cell 1 represents a geographical area that is covered by (i.e., within the range of) a set of transceivers (for example, 101) for a communication network. The set of transceivers may comprise, for example, an antenna array capable of performing directional communication (beam forming) within areas of the boundary of Cell 1. Cell 2 is next to Cell 1 and represents a second geographical area that may be covered by a different set of transceivers. Cell 2 may, be for example, a different cell within the same network as Cell 1.

Alternatively, Cell 2 may be in a network different from that of Cell 1. Cells 1, 3, 4, and 5 are neighboring cells of Cell 2, in this example.

FIG. 1C illustrates additional example coverage areas in the form of satellite coverage areas Sat1 and Sat2 (illustrated as dotted arcs). A satellite coverage area defines a geographical area in which a satellite (for example, 107) supports communication with one or more devices, such as devices 105, 110, 112, 115, and 120 in FIGS. 1A and 1B. Satellite coverage areas may be different sizes and shapes depending upon a number of factors including, orbit, orbit mechanics, topology of the covered area, transmitter strength, antenna size, weather, etc. In FIG. 1C, Sat1 is an example portion of a coverage area of a first satellite and Sat 2 illustrates a portion of a coverage area of a second satellite. Satellite coverage areas may overlap other satellite coverage areas and may overlap cell coverage areas. Satellite coverage areas may be stationary, if for example the satellite is in a geostationary orbit, or may move, if for example the satellite is in a low, medium, or other earth orbit.

One or more of the cells and satellite coverage areas in FIG. 1C may form parts of system embodiments configured to carry out one or more operations described herein. For example, various embodiments may include different varieties of a hybrid terrestrial/satellite network. Various hybrid networks may include a single-frequency network (SFN) or a multi-frequency network (MFN). In a SFN, for example, the multiplex signal transmitted in each neighboring coverage area, whether a terrestrial cell or satellite coverage area, is the same signal on the same frequency. Several signals from multiple distant transmitters in a SFN may be combined constructively to improve signal to noise ratio through diversity gain. In a SFN, the delay between the signals in different multiplexes may be below a certain limit so that the different multiplexes may be received using a single receiver. In an MFN, the signals in neighboring networks may be different and/or may be transmitted on different frequencies. A MFN may also include the same multiplex signal transmitted in each neighboring coverage area, but on different RF carriers.

In various embodiments, a hybrid terrestrial/satellite network may be part of a digital broadcast network (for example, DVB-NGH) having different profiles, each profile operating according to different sets of transmission coding schemes and parameters. In certain variations, the terrestrial and/or satellite transmitted multiplexes may use different encoding schemes, for example, orthogonal frequency division multiplexing (OFDM) or single carrier orthogonal frequency division multiplexing (SC-OFDM). For each different coding scheme, each multiplex may further use different transmission parameters (for example, FFT size, guard interval, etc.)

One example profile of a hybrid network may include an MFN using OFDM encoding (i.e., MFN-OFDM), where each coverage area may transmit its multiplex on a different frequency (MFN) using an OFDM transmission scheme, and where the terrestrial transmitters and the satellite transmitters are configured according to different sets of transmission parameters, respectively (i.e., a terrestrial OFDM parameter set and a satellite OFDM parameter set).

Another example profile of a hybrid network may include a SFN using OFDM encoding (i.e., SFN-OFDM), where each coverage area may transmit its multiplex on the same frequency (SFN) using an OFDM transmission scheme, and using a common set of transmission parameters (i.e., a terrestrial/satellite OFDM parameter set).

A further example profile of a hybrid network may include a SFN using SC-OFDM encoding (i.e., SFN-SC-OFDM), where each coverage area may transmit its multiplex on the same frequency (SFN) using a SC-OFDM transmission scheme, and using a common set of transmission parameters (i.e., a terrestrial/satellite SC-OFDM parameter set).

Still a further example of a hybrid network may include an MFN using SC-OFDM encoding for the satellite transmitters and OFDM encoding for the terrestrial transmitters (i.e., MFN-SC-OFDM/OFDM), where each coverage area may transmit its multiplex on a different frequency (MFN) using different transmission schemes, and where the terrestrial transmitters and the satellite transmitters are configured according to different sets of transmission parameters, respectively (i.e., a terrestrial OFDM parameter set and a satellite SC-OFDM parameter set).

Various other examples of hybrid networks include further combinations of SFN/MFN, SC-OFDM/OFDM, terrestrial and/or satellite parameter sets.

Figure 2:
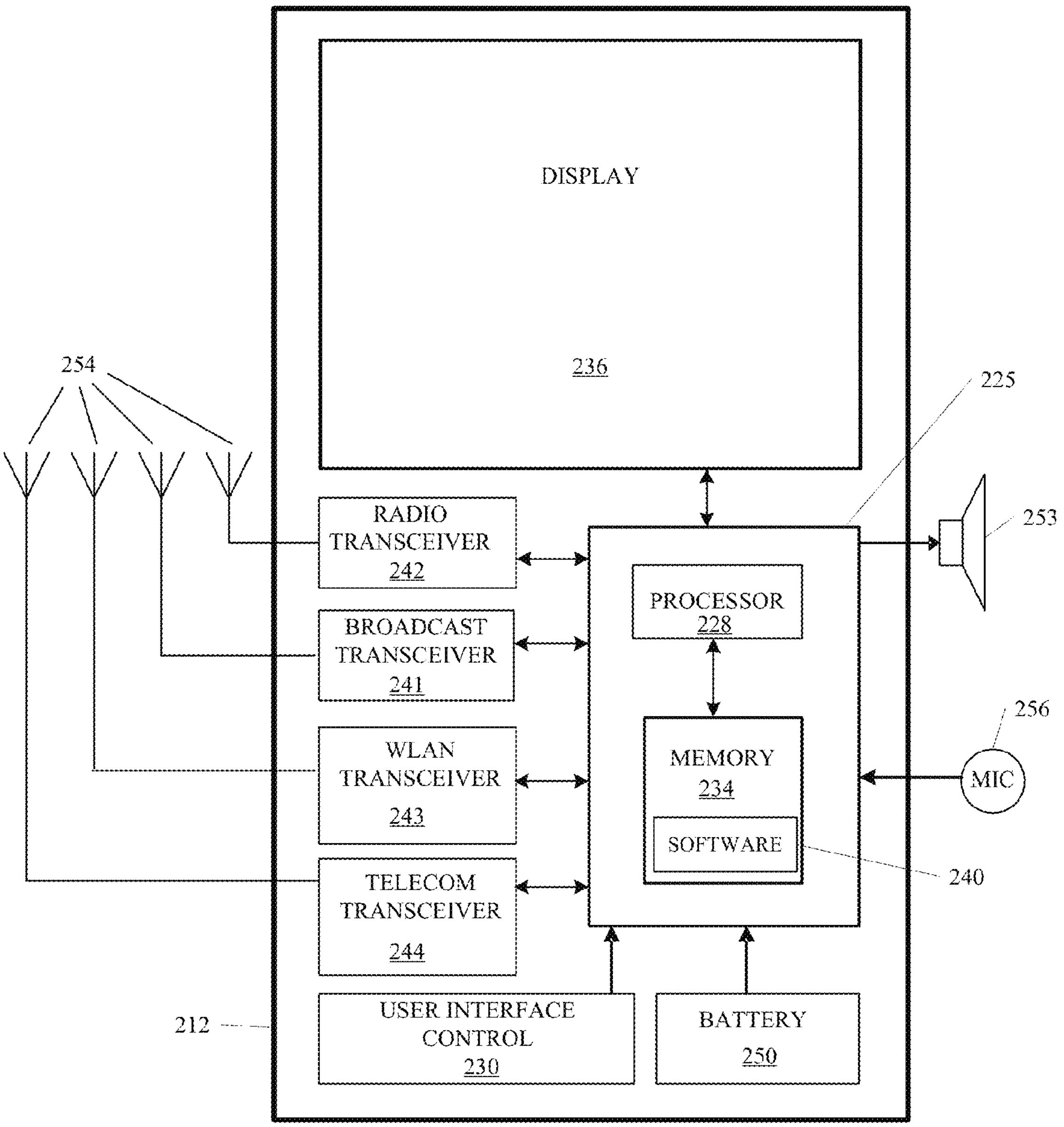
FIG. 2 is a block diagram of an example communication device according to one or more embodiments described herein.

FIG. 2 illustrates an example apparatus, in particular a computing device 212, that may be used in a communication network such as those illustrated in FIGS. 1A-1C, to implement any or all of devices 105, 110, 115, 120, and/or 112. Computing device 212 may include a controller 225 connected to a user interface control 230, display 236 and other elements as illustrated. Controller 225 may include circuitry, such as for example one or more processors 228 and one or more memory 234 storing software 240, for example, client software 165 user interface software, server software, etc.

Device 212 may also include a battery 250 or other power supply device, speaker 253, and one or more antennae 254. Device 212 may include user interface circuitry, such as user interface control 230. User interface control 230 may include controllers or adapters, and other circuitry, configured to receive input from or provide output to a keypad, touch screen, voice interface—for example via microphone 256, function keys, joystick, data glove, mouse and the like. The user interface circuitry and user interface software may be configured to facilitate user control of at least some functions of device 212 though use of a display 236. Display 236 may be configured to display at least a portion of a user interface of device 212. Additionally, the display may be configured to facilitate user control of at least some functions of the device (for example, display 236 could be a touch screen).

Computer executable instructions and data used by processor 228 and other components of computing device 212 may be stored in a storage facility such as memory 234 and/or in hardware logic in an integrated circuit, ASIC, etc. Memory 234 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible machine-readable storage medium is a physical structure that may be touched by a human. A signal would not by itself constitute a tangible machine-readable storage medium, although other embodiments may include signals or other ephemeral versions of instructions executable by one or more processors to carry out one or more of the operations described herein.

Software 240 may be stored within memory 234 to provide instructions to processor 228 such that when the instructions are executed, processor 228, device 212, and/or other components of device 212 are caused to perform various functions or methods such as those described herein. Software may include both applications and operating system software, and may include code segments, instructions, applets, pre-compiled code, compiled code, computer programs, program modules, engines, program logic, and combinations thereof.

Device 212 or its various components may be mobile and be configured to receive, decode and process various types of transmissions including digital broadband broadcast transmissions that are based, for example, on a Digital Video Broadcast (DVB) standard, such as DVB-NGH, DVB-H, DVB-T2, DVB-S, hybrid satellite/terrestrial architectures, and/or Digital Video Broadcasting—Multimedia Home Platform (DVB-MHP), through a specific one or more transceivers 241. Other digital transmission formats may alternatively be used to deliver content and information regarding availability of supplemental services. Additionally or alternatively, device 212 may be configured to receive, decode, and process transmissions through various transceivers, such as FM/AM Radio transceiver 242, wireless local area network (WLAN) transceiver 243, and telecommunications transceiver 244.

Although the above description of FIG. 2 generally relates to a mobile device, other devices or systems may include the same or similar components and perform the same or similar functions and methods. For example, a computer communicating over a wired network connection (for example, PC 115 of FIG. 1A) may include the components or a subset of the components described above, and may be configured to perform the same or similar functions as device 212 and its components.

Some digital video broadcasting protocols provide signaling information to allow for the discovery and reception of services and other data at an electronic device (for example, device 212 of FIG. 2). A service may include several components that together form the service. Components may be also shared between two or more different services. A typical example of a service that includes several components is a teletext service or other non-real time service, which uses the same components for all channels from the same service provider.

Audio/Video (AV) content is another example of component transmission. For scalable video coding, a service may include an audio component, a base layer video component, and an enhancement layer video component. The base layer video component may have lower resolution than the enhancement layer video component. The AV components of each service might not be shared with other services, and may be sufficiently synchronous with each other to avoid synchronization problems at a receiver.

According to some digital video broadcasting protocols, components that make up a particular service like a content program or an interactive function are mapped across a number of protocol layers. The Open Systems Interconnection (OSI) Reference Model, for example, provides for a layered communication architecture including a physical layer (Layer 1, L1), a data link layer (Layer 2, L2), a network layer (Layer 3, L3), a transport layer (Layer 4, L4), a session layer (Layer 5, L5), a presentation layer (Layer 6, L6), and an application layer (Layer 7, L7).

Figure 3:
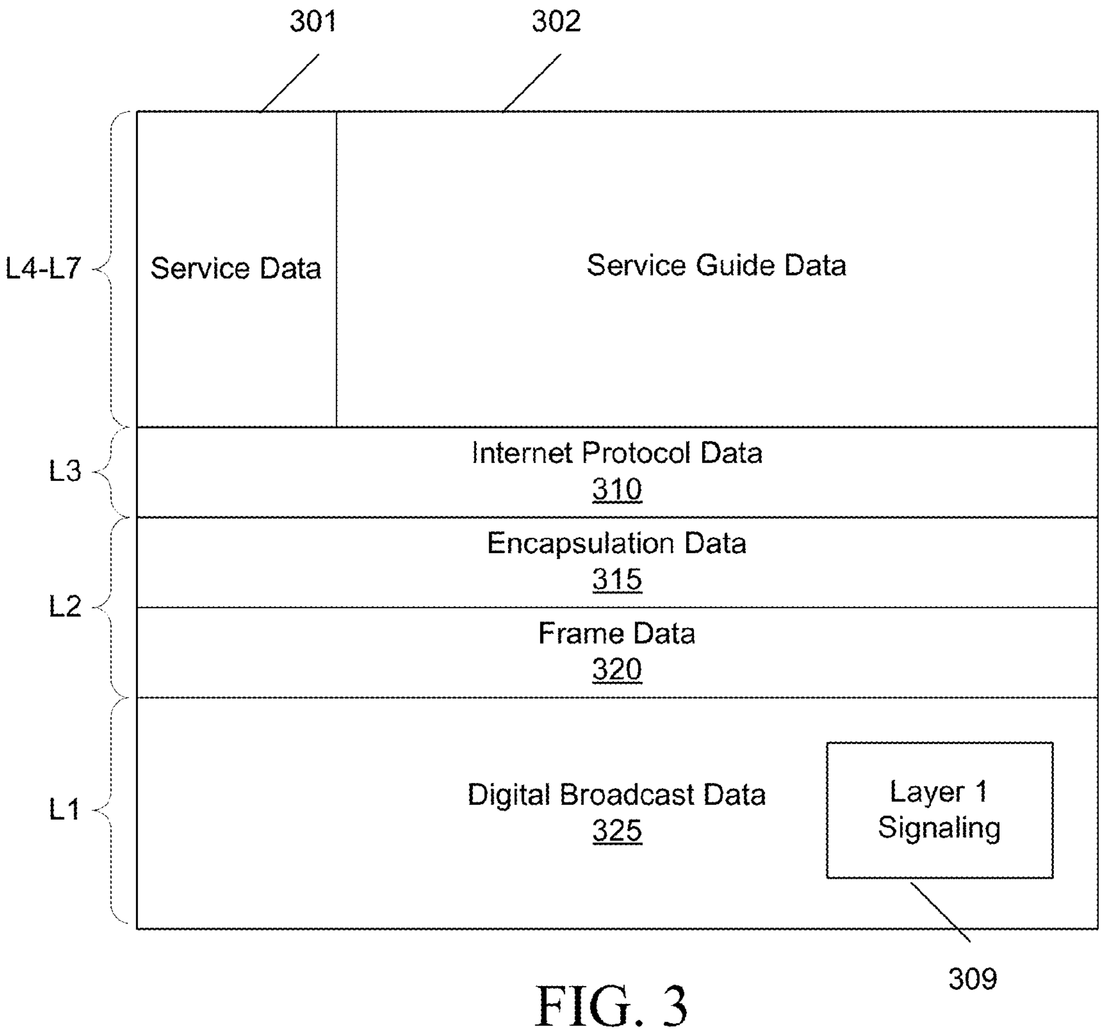
FIGS. 3-4 illustrate example protocol stacks for a digital broadcast system according to one or more embodiments described herein.

FIG. 3 illustrates an example protocol stack similar to the OSI reference model applied to the signaling structure of a digital broadcast system. The example illustrated in FIG. 3 may be used as a protocol structure for a DVB-NGH system delivering content and services 301, including for example, a service guide 302. DVB-NGH includes Internet Protocol (IP) based and Transport Stream (TS) based profiles that may be used to deliver content and other services. DVB-NGH may be used in conjunction with other DVB broadcast systems, such as DVB-T2, DVB-T, DVB-H, DVB-S etc. DVB-NGH may support broadcast delivery of services across different networks, and such support may include allowing for continuity of service.

At the lowest level, the physical layer (for example, L1), as used herein, generally refers to a portion of a network protocol that is configured to define hardware-specific operations for effecting the transmission or reception of electronic signals over a data network. The physical layer is configured to facilitate the transmission of raw bits from a source to a destination. The physical layer may be configured to specify frequencies, voltages, bit rates and the like for transmission of data. The physical layer may include a number of physical layer pipes (PLPs).

A PLP generally refers to a transmission channel between a source and a destination node defined at the physical layer. The physical layer may define multiple channels—pipes—through which raw bits representative of the data such as broadcast data may be sent. For example, different broadcast services, service components, and data associated therewith may be mapped to different physical layer pipes through which the data is transmitted. Accordingly, the physical layer may be configured to identify the appropriate transmission channel for a series of bits corresponding to a particular service and transmit the data through the identified channel or pipe. In a broadcast arrangement, a PLP may be established between a source and multiple destinations. In one example, a PLP may correspond to a physical layer time multiplexed channel that is carried by specified slices of a transmission stream (for example, a DVB-T2 stream, which uses time-division multiplexing). A PLP may also correspond to a physical layer multiplexed channel within a plurality of frequencies, for example as in the time-frequency slicing mode of DVB-T2 or DVB-NGH. When an end-user device wishes to access a component of a particular service, the end-user device may identify the corresponding PLP or PLPs from which to access the service data.

In the broadcast scenario, a receiving device may listen for the particular PLP or PLPs carrying the desired service or services. Example embodiments permit transmission of multiple service components within the same PLP or different PLPs, as well as with different robustness levels for each PLP containing the components. Each physical layer multiplex may be transmitted in one or more of the coverage areas illustrated in FIG. 1C (for example, cell 1, cell 2, Sat 1, etc.). A multiplex transmitted and received in a coverage area in which the receiving device is located may be referred to as a local or current multiplex. Multiplexes transmitted from neighboring or other coverage areas may be referred to as neighboring multiplexes. Above the physical layer, PLPs corresponding to components of a single service may be identified by combining PLPs into a logical grouping—into a link layer pipe (LLP)—that is associated with a service. LLPs generally refer to logical associations such as mappings that link one or more PLPs together. In some embodiments, a link layer pipe may not be identified by a specific identifier and an LLP may be merely a logical grouping of the PLPs. In such case, the PLPs may be transmitted with similar transmission parameters and suitable location to enable easy reception of the PLPs in question.

Grouped PLPs for a particular LLP may be defined by specified cells or slices and packet sizes in a transmission stream. For example, a first PLP for an LLP might be defined as occupying the first, fifth, and ninth slices in a payload portion of a DVB-T2 frame. PLPs may occupy different numbers of available cells or slices; for example, a PLP may be twice as large as another PLP and, therefore may occupy twice the number of available cells. A remainder of a DVB-T2 frame may be apportioned to header data and other LLP frames of other services.

The data depicted in FIG. 3 may be transmitted in one or more dedicated and/or dynamically allocated LLPs, and/or may be transmitted in one or more dedicated and/or dynamically allocated PLPs, used by the system.

Above the physical layer (for example, digital broadcast data) 325, upper level data (for example, service data 301 and service guide data 302) may be carried within one or more Internet Protocol (IP) streams at the IP stack layer 310, which is encapsulated into sections as encapsulation data 315, which may be encoded into transport streams as frame data 320. Encapsulation data 315 and internet protocol data 320 together may form an MPEG-2 transport stream, or alternatively, may form Generic Stream Encapsulation (GSE) frames, or some other encapsulation frames.

As previously discussed, the service guide data (SG) 302 describes for users the services and content available for subscription or purchase. One example of SG data 302 transmitted on top of layer 3 Internet Protocol 310 is described for example in the Open Mobile Alliance (OMA)—Service Guide for Mobile Broadcast Services specification, OMA-TS-BCAST_Service_Guide-V1__1, dated Sep. 14, 2010 (hereinafter OMA BCAST ESG). The OMA BCAST ESG standard is incorporated herein by reference in its entirety.

The services may include audio, video, and other types of data, and may include Open Mobile Alliance Mobile Broadcast (OMA BCAST) services. The service data and the SG data may be transmitted through a variety of types of networks according to many different protocols. For example, data may be transmitted through a collection of networks usually referred to as the "Internet" using protocols of the Internet protocol suite, such as Internet Protocol (IP) and User Datagram Protocol (UDP). Data may be transmitted through the Internet addressed to a single user. Data may also be addressed to a group of users, commonly known as multicasting.

The service guide enables a terminal to communicate what services are available to end users and how the services may be accessed. The SG may include independently existing pieces of SG fragments. In various examples, SG fragments include XML and/or binary documents, and may encompass a vast array of items, such as for example, a SDP (Session Description Protocol) description of media files, textual files, and/or an image. In some variations, SG fragments may each be separate well-formed XML documents that are uniquely identifiable, and the entire SG may be defined as a set of these fragments. Because each fragment is a complete XML document, which is unique, the fragments may be individually replaced and updated as programming content and services change.

The SG fragments describe one or several aspects of currently available (or future) services, content, or broadcast programs. Such aspects may include for example: free text description, schedule, geographical availability, price, purchase method, genre, and supplementary information such as preview images or clips.

The SG fragments may be organized and formatted to provide different types of information. For example, some fragments may describe a broadcast service and include metadata that identifies components associated with the service, availability of the service, and an overall description of the service. Such fragments may point to other fragments, which provide further details of the service. The other fragments may provide detailed descriptions of components within a service, define timeframes of the components are streamed/downloaded and rendered, describe capabilities and options for a terminal to access content and services, describe groups of services which may be provided together, describe purchase and pricing information for groups of services, describe subscription channels on which purchased services may be obtained, provide preview information, and provide information about interactivity of services.

Certain SG fragments may also provide session description information for each service, which includes information for session initiation of a service, such as a multimedia service. These fragments may include session description information that conveys session announcements, and other description information used for delivery procedures to initiate a session of a service. The session description information in the SG for a service may be formatted according to the Session Description Protocol (SDP) as defined for example in the Request for Comment standard, RFC4566, published by the Internet Engineering Task Force (IETF), or according to 3GPP the MBMS User Service Bundle Description standard 3GPP TS 26.346.

For each service, certain SG fragments may provide access information that describes how a client device may access the service. These fragments may include information on the delivery method of the service, the required capabilities of the client device to use the service, and provide alternative ways to access or interact with the service. The access fragments may include reference to the fragments with session description information described above, or include the session description information directly in SDP format or another format.

Each service included in the SG information may have a global service identifier, which may be a unique identifier of the service. Each service may be associated with one or more components that may respectively transport audio, video, text, etc. Each component may be associated with a uniform resource identifier (URI) to identify information corresponding to the component. In various examples, using SG information and signaling information as further described below with respect to FIGS. 5A-5F a receiving device may identify a particular PLP carrying a component of a desired service. The service guide may be used to provide service-to-component linkage and the signaling information may be used to provide component to PLP mapping. SG information may be received via any type of bearer (for example, application, point-to-point, broadcast, uni-directional etc.).

Figure 4:
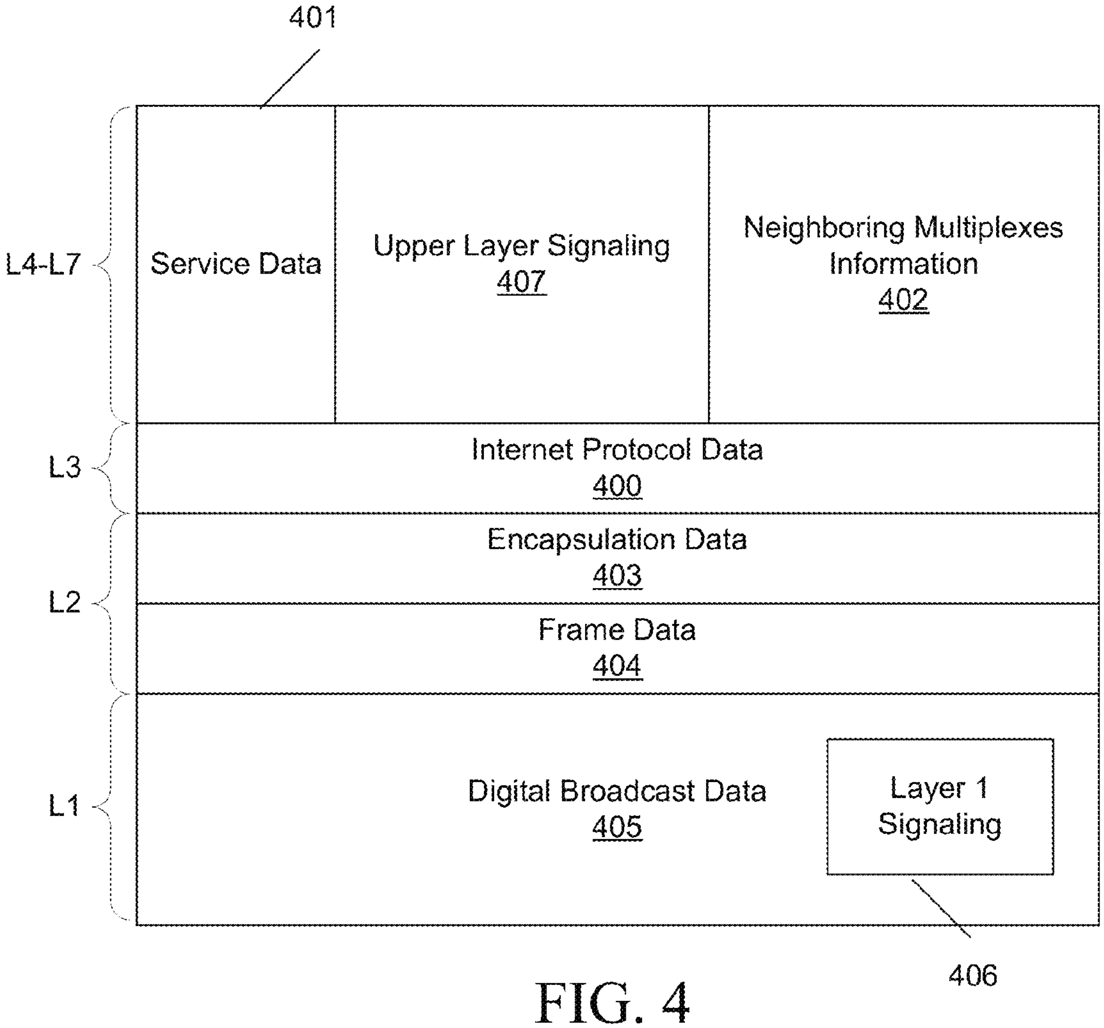

FIG. 4 illustrates an example protocol stack of FIG. 3 with signaling information for a digital broadcast system. The signaling information may include upper layer signaling information (ULI) 407 and neighboring multiplexes information (NMI) 402. The ULI 407 may include upper level and layer 2 (L2) signaling data for a broadcast protocol (for example, DVB-NGH), which maps service components to associated PLPs in a local multiplex, i.e., the multiplex transmitted in the coverage area where the receiving device is located and received by the receiving device. The NMI 402 may include information that maps service components to associated PLPs in multiplexes available within neighboring cells, neighboring satellite coverage areas, and/or other multiplexes. As further discussed below, the NMI may be used to assist in handover from a local multiplex to a neighboring multiplex. The local multiplex may be a multiplex transmitted either within a terrestrial cell from a land-based transmitter or within a satellite coverage area from a satellite. Likewise, the neighboring multiplex may be a multiplex transmitted either, within a terrestrial cell from a land-based transmitter or within a satellite coverage area from a satellite.

In some embodiments, ULI 407 and NMI 402 may be carried on top of OSI layer 3 information. For example, ULI 407 and NMI 402 may be carried on top of the Internet Protocol layer, which includes Internet Protocol data 400. Below the Internet Protocol layer may be data that includes encapsulation data 403, frame data 404 and digital broadcast data (e.g., DVB-NGH data) 405. L1 signaling 406 may be carried with the digital broadcast data 425. An example of frame data 404 is the baseband frame of the DVB-NGH system. An example of the digital broadcast data is the physical layer data transmitted according to the DVB-NGH system.

In various embodiments, the ULI 407 and NMI 402 signaling data may be allocated in dedicated and/or dynamically allocated IP addresses and ports, or may be included within a dedicated PLP. In certain variations, the ULI 407 and NMI 402 signaling may be carried within the service guide information (for example, in SG data 302).

ULI 407 may include information that maps services into the component identifiers for the services, and may include SG specific signaling information and/or other upper layer transmission protocol data, such as data of protocols defined in OMA BCAST ESG and/or DVB Internet Protocol Device Control (IPDC). Additionally, the ULI may include information that maps services into component identifiers for the services and provides Robust Header Compression (RoHC) information for each data stream.

Figure 5A:
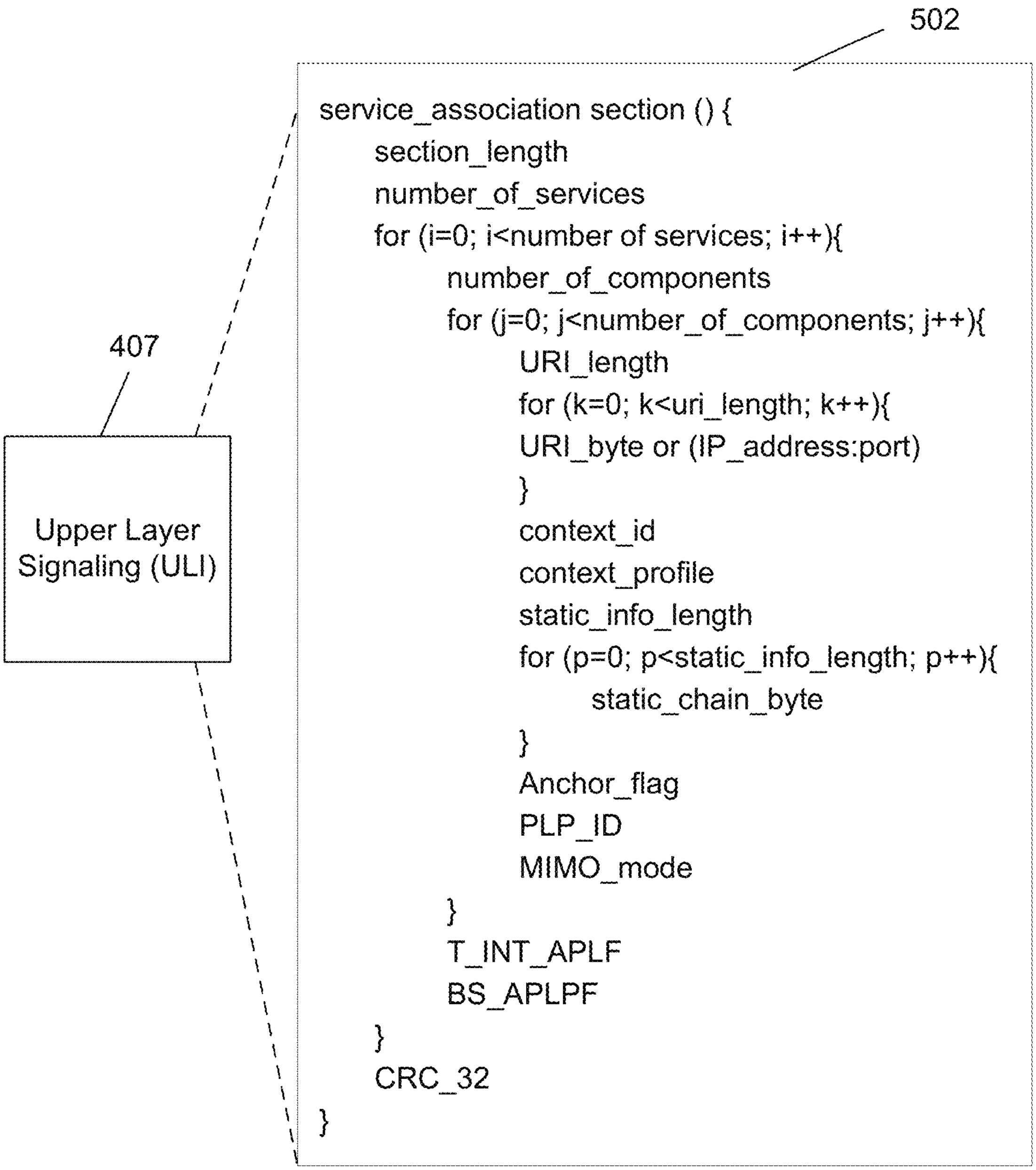

One example of ULI 407 is illustrated in FIG. 5A, which includes a service_association section 502. Some embodiments of service_association section 502 incorporate a nested sequence of data elements. In FIG. 5A, this nested sequence of data elements is for convenience represented by loop pseudo-code. Other embodiments may incorporate a simplified structure in which the upper layer information 502 is represented by a section that is pre-defined (for example, predefined length and section structure). In some embodiments, service_association section 502 may be a table and/or a part of a table, and may include information related to the table, such as a table identifier, table section information (for example, a section length parameter), a table version number, a table section number, a previous section number, other data flags, etc.

Referring to the information included within the service_association section 502, a section_length parameter may be a field (for example, a 32 bit field) that indicates the length of the service association section and a number_of_services parameter may be a field (for example, an 8 bit field) indicating the number of services delivered through the current channel (for example, multiplex). In the representation of FIG. 5A, number_of_services indicates the number of iterations for the loop that is located in the example service_association section 502 between number_of_services and CRC__32. In an actual ULI signaling structure, the number_of_services parameter could represent a number of consecutive data blocks, with each of those blocks including data of the types described below and corresponding to other parameters in FIG. 5A between "for (i=0; i<number of services; i++)" and "CRC__32."

Each service may include one or more components, and the number_of_components parameter may be a field (for example, 8-bit field) used to indicate the number of components delivered through the corresponding service. In the representation of FIG. 5A, number_of_components indicates the number of iterations for the loop that is located in the example service_association section 502 immediately following the number_of_components parameter. In an actual ULI signaling structure, the number_of_components parameter could represent a number of consecutive data blocks, with each of those blocks including data of the types described below and corresponding to other parameters in FIG. 5A in the loop beginning with "for (j=0; j<number_of_components; j++)."

For each component of each service, a resource length parameter (for example, URI_length) may be a field (for example, 8 bit field) used for indicating the length of the URI for that service/component. In the representation of FIG. 5A, URI_length indicates the number of iterations of the loop that is located in the example service_association section 502 between URI_length and context_id, and that retrieves the URI_byte or (IP_address:port) parameter(s). In an actual ULI signaling structure, the URI_length parameter could represent a number of consecutive data blocks, with each of those blocks including data of the types described below and corresponding to other parameters in FIG. 5A between "for (k=0; k<uri_length; k++)" and "MIMO Mode."

The URI_byte or (IP_address:port) parameter(s) may be a string of one or more bytes (for example, text bytes), which indicate the URI or number sequence (for example, IPv4/IPv6 address and port number) for locating a service/component identified by the data block within the sequence of data blocks associated with a given "i" and "j" in the representation of FIG. 5A.

In addition to the URI location identifier string, a number of other parameters are provided for each service/component to support RoHC decompression. These may include a context_id parameter indicating the context id of the RoHC compressed IP stream, the context_profile parameter indicating context profile of the compressed IP stream, the static_info_length parameter indicating the length of the static_chain_byte sequence, and the static_chain byte parameter, which may be a byte sequence indicating the static information of the compressed IP stream.

The RoHC may use two kinds of context IDs (CIDs), a small CID and a large CID. The small CID may be one octet from 1 to 15, and the large CID may be one or two octets from 1 to 16383. The size of context id may be determined as follows. If the CID starts with "1110", the CID is one octet, and the remaining 4 bits indicate a value ranging from 1-15. If the CID starts with a "0", the CID is a large CID having one octet, with the remaining 7 bits indicating a value from 1-127. If the CID starts with "10", the CID is a large CID with two octets, with the remaining 14 bits indicating a range of 1-16383.

For each component of each service, a PLP_ID parameter may be a field (for example, 8 bit field) identifying uniquely the physical layer pipe (PLP) through which the corresponding component is delivered.

ULI 502 may further include Anchor_flag, MIMO_mode, and FRU parameters for each component. The Anchor_flag parameter for each component may be a field (for example, 1 bit field) indicating that the PLP for this component is an anchor for all associated PLPs for the associated service, i.e. PLPs associated mutually with the anchor PLP have the same parameters, which are mapped with the anchor PLP. The MIMO_mode parameter, which may be a field (for example, 2-bit field), may indicate a single-input-single-output/multiple-input-multiple-output (SISO/MIMO) profile for the PLP carrying the component. Single and multiple refers to the number of antennas used in the transmitter and receiver, whereas the output refers to the receiver and the input refers to the transmitter.

A PLP may comprise multiple frames, which may be used to allow for the fair division of resources in a broadcast transmission stream. Accordingly, a first frame of a PLP may be transmitted at time T1, while a second frame may be transmitted at time T2 and a third frame may be transmitted at time T3. PLP frames may vary in size from frame to frame. A T_INT_APLF parameter and a BS_APLPF parameter may also be included in ULI 407 for each service. The T_INT_APLF parameter, which may be for example 16 bits, may define the amount of time (for example in milliseconds or in OFDM symbols) between two consecutive frames of all service associated PLPs. During the time between the service associated PLPs, other PLPs in other frames may be transmitted. The BS_APLPF parameter, which may be 24-bits, may indicate a maximum buffer size (for example, in OFDM symbols) for the service associated PLP frames. Based on the T_INT_APLF and BS_APLPF parameters, a receiver may determine if the previous associated PLP frames may be processed during this time in order to free available buffer space for receiving the next associated frame.

A cyclic redundancy check (CRC) parameter (for example, CRC__32) may contain a CRC value for performing a redundancy check. In one example, CRC__32 may be a 32-bit field that contains the value that gives a zero output of the registers in the CRC decoder.

Figure 5B:
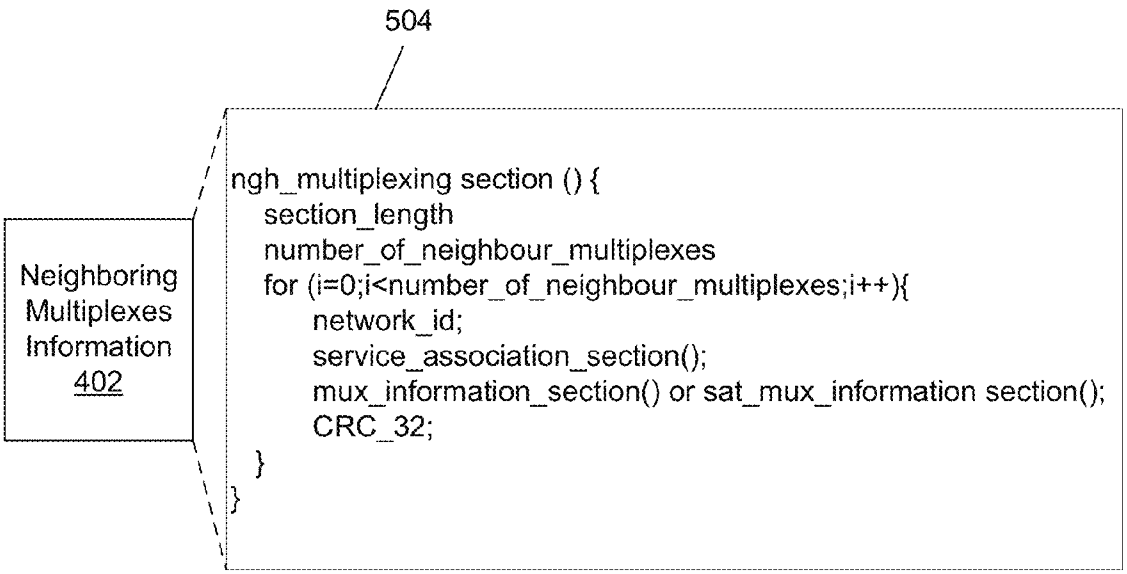

As previously discussed, signaling information for a digital broadcast system may include neighboring multiplexes information (NMI) 402 as shown in FIG. 4. One example of NMI 402 is illustrated in FIG. 5B, which may include, for example, a neighboring multiplexing section 504. Neighboring multiplexing section 504 may include various illustrative parameters for identifying neighbouring multiplexes that may include some of the same services available in the currently received multiplex (i.e., local multiplex). Some embodiments of ngh_multiplex_section 504 may incorporate a nested sequence of data elements. In FIG. 5B, this nested sequence of data elements is for convenience represented by loop pseudo-code. Other embodiments may incorporate a simplified structure in which ngh_multiplex_section 504 is represented by a section that is pre-defined (for example, predefined length and section structure).

Referring to 504, a section length parameter (for example, section_length) may indicate the entire length of the section. A number_of neighbour_multiplexes parameter may indicate the number of neighbouring multiplexes described in 504, which may indicate the number of iterations of the pseudo-code loop following the number_of neighbour_multiplexes parameter. In an actual NMI signalling structure, the number_of neighbour_multiplexes parameter could represent a number of consecutive data blocks, with each of those blocks including data of the types described below and corresponding to other parameters in 504 between "for (i=0; i<number_of neighbour_multiplexes; i++)" and "CRC__32."

For each neighbour multiplex (i.e., each iteration of the pseudo-code loop), the neighboring multiplex section 504 may include a network_id parameter, a service_association_section, and a mux_information_section or a sat_mux_information section. The network identifier (for example, network_id) may be used for uniquely identifying the neighboring network (for example, cell or satellite coverage area) carrying the multiplex. The service association section, may be similar to the service association section 502 in ULI 407 illustrated in FIG. 5A, but may include parameters pertaining to the neighboring multiplex, instead of the currently received multiplex. The mux_information_section may include parameters for discovering and acquiring the neighboring multiplex transmitted in a neighboring terrestrial cell. The sat_mux_information_section may include parameters for discovering and acquiring the neighboring multiplex transmitted from a satellite in a neighboring satellite coverage area.

FIG. 5C illustrates one example 506 of a mux_information_section listed in the ngh_multiplex_section 504 for neighboring terrestrial cells. Some embodiments of mux_information_section 506 may incorporate a nested sequence of data elements. In FIG. 5C, this nested sequence of data elements is for convenience represented by loop pseudo-code. Other embodiments may incorporate a simplified structure in which mux_information_section 506 is represented by a section that is pre-defined (for example, predefined length and section structure).

In 506, the NGH_system_id parameter may be used to indicate the configuration of the multiplexing of the frame, i.e., frames having the same NGH_system_id may have the same configuration.

A cell identifier (for example, cell_id) may be used for identifying a cell. In one example, the cell_id for each cell may be unique within a single network.

A number_RF parameter may indicate the number of RF carriers for the neighboring multiplex in the terrestrial cell. In the representation of 506, number_RF indicates the number of iterations of the pseudocode loop following the number_RF parameter. In an actual NMI signaling structure, the number_RF parameter could represent a number of consecutive data blocks, with each of those blocks including data of the types described below and corresponding to other parameters in 506 in the loop beginning with "for (i=0; i<number_RF; i++)." For each RF carrier of the neighboring multiplex, 506 may include the following parameters.

An RF_id may identify the RF carrier with a unique value within the neighboring cell.

A bandwidth parameter may indicate the bandwidth used within PLPs within the neighboring multiplex.

The transmission_mode parameter may indicate the transmission mode, for example, FFT size used within the PLPs.

A guard interval field (for example, GUARD_INTERVAL) may be used for indicating the guard interval of the current super-frame of the neighboring multiplex.

A common_clock_reference_id parameter may indicate the synchronization information between frames carried within two different signals, i.e., the receiver is able to determine the jitter between two different frames when performing handover.

An in_band_flag parameter may indicate whether in-band signaling is used within the neighboring multiplex. If the in_band_flag parameter is set, 506 may include ngh_slot_length and ngh_slot_interval parameters. The ngh_slot_length parameter may indicate the slot length of particular NGH slot. The ngh_slot_interval parameter may indicate the interval between NGH slots. If the in_band_flag parameter is not set, the ngh_slot_length and ngh_slot_interval parameters might not be included in 506.

A number_of_LNC parameter may indicate the number of logical network channels (LNCs) within the neighbouring terrestrial multiplex. In the representation of 506, the number_of_LNC parameter may indicate the number of iterations of the pseudocode loop following the parameter. In an actual NMI signalling structure, the number_of_LNC parameter could represent a number of consecutive data blocks, with each of those blocks including data of the types described below and corresponding to other parameters in 506 in the loop beginning with "(i=0; i<number_of_LNC; i++)." For each LNC, an RF_main parameter and one or more PLPs are identified. The RF_main parameter indicates the main frequency in an associated NGH frame. Following the RF_main parameter in 506, a nof_PLP parameter indicates the number of PLPs within the LNC. The nof_PLP parameter indicates the number of iterations of the pseudocode loop following the parameter. In an actual NMI signalling structure, the nof_PLP parameter could represent a number of consecutive data blocks, with each of those blocks including a PLP_id identifying one of the PLPs within the LNC.

FIG. 5D illustrates one example 508 of a sat_mux_information_section listed in the ngh_multiplex_section 504 for available multiplexes in neighboring satellite coverage areas. Some embodiments of sat_mux_information_section 506 may incorporate a nested sequence of data elements. In FIG. 5D, this nested sequence of data elements is for convenience represented by loop pseudo-code. Other embodiments may incorporate a simplified structure in which sat_mux_information_section 508 is represented by a section that is pre-defined (for example, predefined length, predefined number of sections, predefined structure, etc.).

In sat_mux_information_section 508, the parameters and the number of bits (identified in the "bits" column) for each field have been selected such that parameters for multiple different profiles may be signaled. Other examples may include a subset of these parameters or additional parameters, and the parameters in various examples may include more or less bits.

In 508, a number_of_frequencies parameter may indicate the number of RF carriers available from the neighboring satellite multiplex. In the representation of 508, number_of_frequencies indicates the number of iterations of the pseudocode loop following the number_of_frequencies parameter. In an actual NMI signaling structure, the number_of_frequencies parameter could represent a number of consecutive data blocks, with each of those blocks including data of the types described below and corresponding to other parameters in 508 in the loop beginning with "for (i=0; i<number_of_frequencies; i++)." For each RF carrier of the neighboring satellite multiplex, 508 may include the following parameters.

A frequency parameter field in 508 may include one or more bits (for example, 32 bits) that indicate the frequency of the RF signal carrying the neighboring satellite multiplex.

An orbital_position field in 508 may include one or more bits (for example, 16 bits) that indicate the orbital position in degrees. In one example, a 16-bit field may be portioned into four 4-bit binary-coded-decimal (BCD) values with a decimal point occurring after the third value (e.g. 019.2°). In other variations, orbital position may be represented in other units of measure.

A west_east_flag field in 508 may include one or more bits (for example 1 bit) that indicate if the satellite position is in the western or eastern part of the orbit. A value "0" may indicate the western position and a value "1" may indicate the eastern position. The assignment of value to position may be the opposite (for example, '1'=western, '0'=eastern) in certain variations.

A polarization parameter field may include one or more bits (for example 2 bits) that indicate the polarization of the RF signal carrying the neighboring satellite multiplex. Table 1 below illustrates a signaling definition of the polarization field. Table 1 is an example only, and in other variations, each polarization parameter may be associated with a different number of bits and different bit combination. In some variations, as in the example below, the first bit may indicate whether the polarization is linear or circular.

TABLE 1

| Polarization | Description |
|---|---|
| 00 | linear—horizontal |
| 01 | linear—vertical |
| 10 | Circular—left |
| 11 | Circular—right |

A satellite_profile field may include one or more bits (for example 2 bits) that indicate a transmission profile for the hybrid network system. Illustrative profiles are described above with respect to FIG. 1C. Table 2 below illustrates a signaling definition of the satellite_profile field. Table 2 is illustrative only, and in certain variations, each satellite_profile value may be associated with a different number of bits and different bit combination. The different satellite profiles may be more generally understood as different parameter sets, which may be used to create various different transmission scenarios.

TABLE 2

| Satellite_profile | Description |
|---|---|
| 00 | MFN-OFDM |
| 01 | SFN-OFDM |
| 10 | SFN-SC-OFDM |
| 11 | reserved |

As previously discussed with respect to FIG. 1C, in a MFN-OFDM profile, each coverage area may transmit its multiplex on a different frequency (MFN) using an OFDM transmission scheme, and the terrestrial transmitters and the satellite transmitters may be configured according to different sets of transmission parameters, respectively (i.e., a terrestrial OFDM parameter set and a satellite OFDM parameter set). Where the parameter sets are different, the mux_information_section illustrated in FIG. 5C for neighboring cells may indicate different signaling parameters than the signaling parameters in the sat_mux_information_section for neighboring satellite coverage areas.

In the SFN-OFDM and SFN-DC-OFDN profiles, the terrestrial transmitters in neighboring cells and the satellite transmitters for satellite coverage areas may transmit the same signal. As such, the mux_information_section, and the sat_mux_information_section may indicate similar signaling parameters.

A bandwidth parameter field in 508 may include one or more bits (for example 5 bits) that indicate the bandwidth of the RF signal carrying the neighboring satellite multiplex. Table 3 below illustrates a signaling definition of the bandwidth field. Table 3 is illustrative only, and in other variations, each bandwidth value may be associated with a different number of bits and different bit combination.

TABLE 3

| Bandwidth | Description |
|---|---|
| 00000 | 1.7 MHz |
| 00001 | 2.5 MHz |
| 00010 | 5.0 MHz |
| 00011 | 6.0 MHz |
| 00100 | 7.0 MHz |
| 00101 | 6.0 MHz |
| 00110 | 7.0 MHz |
| 00111 | 8.0 MHz |
| 01000 | 10.0 MHz |
| 01001 | 15.0 MHz |

TABLE 3-continued

| Bandwidth | Description |
|---|---|
| 01010 | 20.0 MHz |
| 01011 . . . 11111 | reserved |

A preamble_type parameter field in 508 may include one or more bits (for example 1 bit) that indicate a preamble type for frames in the transmission scheme (for example, OFDM or SC-OFDM transmission schemes). For example, preamble_type may indicate the number of P1 symbols in an OFDM or SC-OFDM encoding scheme. Table 4 below illustrates a signaling definition of the preamble_type field. Table 4 is illustrative only, and in certain variations, each preamble_type value may be associated with a different number of bits and different bit combination. Alternatively, the preamble_type field may not be present for certain satellite profiles since there may be only one possible preamble_type.

TABLE 4

| preamble_type | Description |
|---|---|
| 0 | Single P1 |
| 1 | P1 + aP1 |

An FFT_size parameter field in 508 may include one or more bits (for example 3 bits) that indicate a fast Fourier transform configuration used in the satellite transmission. Table 5 below illustrates a signaling definition of the FFT_size field. Table 5 is illustrative only, and in certain variations, each FFT_size value may be associated with a different number of bits and different bit combination. In some variations, FFT_size field may indicate the same information as the transmission_mode field in the mux_information_section 506.

TABLE 5

| FFT_size | Description |
|---|---|
| 000 | 0.5 K |
| 001 | 1 K |
| 010 | 2 K |
| 011 | 4 K |
| 100 | 8 K |
| 101 | 15 F |
| 110 . . . 111 | reserved |

A guard_interval parameter field in 508 may include one or more bits (for example, 3 bits) that indicate a guard_interval used in the transmission encoding (for example, OFDM) used in the neighboring satellite transmission. Table 6 below illustrates a signaling definition of the guard_interval field. Table 6 is illustrative only, and in other variations, each guard_interval value may be associated with a different number of bits and different bit combination. In some variations, the guard_interval field may indicate the same information as the guard_interval field in the mux_information_section 506.

TABLE 6

| guard_interval | Description |
|---|---|
| 000 | 1/128 |
| 001 | 1/32 |
| 010 | 1/16 |
| 011 | 19/256 |
| 100 | 1/8 |
| 101 | 19/128 |
| 110 | 1/4 |
| 111 | reserved |

A pilot_pattern field in 508 may include one or more bits (for example, 3 bits) that indicate a pilot pattern used in the transmission encoding scheme used in the neighboring satellite transmission. For example, in OFDM, the pilot_pattern may indicate a pattern of training symbols distributed on sub-carriers and known to the receiver for performing channel estimation. Table 7 below illustrates a signaling definition of the pilot_pattern field, which includes seven different predefined pilot patterns, which are known to receivers. Table 7 is illustrative only, and in other variations, each pilot_pattern value may be associated with a different number of bits and different bit combination. The definition of each pilot_pattern parameter may be specific to the transmission scheme (for example, OFDM).

TABLE 7

| pilot_pattern | Description |
|---|---|
| 000 | PP1 |
| 001 | PP2 |
| 010 | PP3 |
| 011 | PP4 |
| 100 | PP5 |
| 101 | PP6 |
| 110 | PP7 |
| 111 | reserved |

A frame_synch_offset parameter field in 508 may include one or more bits (for example 2 bits) that indicate an offset between the physical layer frame transmitted within the current (i.e., local) multiplex and the physical layer frame transmitted within the associated neighboring multiplex. In some embodiments, the frame_synch_offset parameters may be replaced by the common_clock_reference_id parameter to indicate the synchronization information between frames carried within two different signals. In both embodiments, a receiver is able to determine the jitter between two different frames when performing handover.

Each service carried by the neighboring satellite multiplex may include one or more components, and the number_of_components parameter may be a field (for example, 8-bit field) used to indicate the number of services/components available on the neighboring satellite multiplex. In the representation of FIG. 5D, number_of_components indicates the number of iterations for the pseudocode loop that is located immediately following the number_of_components parameter. In an actual NMI signaling structure, the number of components parameter could represent a number of consecutive data blocks, with each of those blocks including data of the types described below and corresponding to other parameters in FIG. 5D in the loop beginning with "for (j=0; j<number_of_components; j++)."

Within the loop, a component_id parameter may include one or more bits (for example 8 bits) that indicate a 'short_id' or index which is used for the identification of services/components within the current (i.e., local) and neighboring cell and satellite multiplexes. The component_id parameter may be unique for each multiplex, and hence, it may be re-used by each multiplex for its signaling of local and adjacent services.

For each component of each service, a PLP_ID parameter may be a field (for example, 8 bit field) identifying uniquely the physical layer pipe (PLP) through which the corresponding service/component is delivered.

FIG. 5E illustrates another embodiment of sat_mux_information_section 510 where the content varies depending upon the profile of the hybrid system. The features of 510 are the same as in 508, except as follows.

Sat mux_information_section 510 includes a pseudocode conditional if-then statement, with each branch of the if-then statement representing a different set of parameters included in the section depending upon the profile. In an actual NMI signaling structure, only the parameters in one of the if-then branches is included the section depending upon the value of the satellite_profile parameter. The size and definition of each parameter may be different for different profiles as indicated below.

In various examples, parameter fields: bandwidth, preamble_type, FFT_size, guard_interval, and pilot_pattern may include a different number of bits having different assigned values for different values of satellite_profile. For example, if satellite_profile='10', there may be no pilot_pattern field at all. This reduces the needed signaling capacity for the '10' profile.

In FIG. 5E, the numbers in the parenthesis give the total number of bits used in the example for a particular profile. By tailoring the sat_mux_information_section based on profile, data bandwidth may be saved for profiles that require less parameters.

The following tables illustrate the mapping of the signaling field values to the parameters according to various embodiments. In the tables below, for each satellite profile value, the number of bits of each field may be different. For example, in profiles '01', '11', and '00', the preamble_type parameter may be defined as illustrated above with respect to Table 4, but in profile '10' the preamble_type may not be present. The profile '10' may always have the same preamble configuration (for example, a single P1 symbol), and thus may not need a preamble_type parameter. In another example, in table 8 below, bandwidth is represented with one bit for satellite profiles '01' and '10', and is represented by 5 bits for profiles '00' and '11'. Note that profile '11' in the disclosed examples is not defined. In certain variations, the profile '11' may be reserved, or may represent another profile.

Table 8 illustrates example bit width and bit assignments for the bandwidth parameter in sat_mux_information_section 510. Table 8 is illustrative only, and in other variations, each bandwidth value may be associated with a different number of bits and different bit combination.

TABLE 8

| Description Satellite_profile = | | | |
|---|---|---|---|
| '01' | '10' | '00' or '11' | Bandwidth |
| | | 00000 | 1.7 MHz |
| 0 | 0 | 00001 | 2.5 MHz |
| 1 | 1 | 00010 | 5.0 MHz |
| | | 00011 | 6.0 MHz |
| | | 00100 | 7.0 MHz |
| | | 00101 | 6.0 MHz |
| | | 00110 | 7.0 MHz |
| | | 00111 | 8.0 MHz |
| | | 01000 | 10.0 MHz |
| | | 01001 | 15.0 MHz |
| | | 01010 | 20.0 MHz |
| | | 01011 . . . 11111 | reserved |

Table 9 illustrates example bit width and bit assignments for the FFT_size parameter in sat_mux_information_section 510. Table 9 is illustrative only, and in other variations, each FFT_size value may be associated with a different number of bits and different bit combination.

TABLE 9

| Description Satellite_profile = | | | |
|---|---|---|---|
| '01' | '10' | '00' or '11' | FFT_size |
| | 00 | 000 | 0.5 K |
| 0 | 01 | 001 | 1 K |
| 1 | 10 | 010 | 2 K |
| | | 011 | 4 K |
| | | 100 | 8 K |
| | | 101 | 15 F |
| | 11 | 110 . . . 111 | reserved |

Table 10 illustrates example bit width and bit assignments for the guard_interval parameter in sat_mux_information_section 510. Table 10 is illustrative only, and in other variations, each guard_interval value may be associated with a different number of bits and different bit combination.

TABLE 10

| Description Satellite_profile = | | | |
|---|---|---|---|
| '01' | '10' | '00' or '11' | Guard_interval |
| | | 000 | $1/128$ |
| 00 | 0 | 001 | $1/32$ |
| 01 | 1 | 001 | $1/16$ |
| | | 011 | $19/256$ |
| 10 | | 100 | $1/8$ |
| | | 101 | $19/128$ |
| 11 | | 110 | $1/4$ |
| | | 111 | Reserved |

Table 11 illustrates example bit width and bit assignments for the pilot_pattern parameter in sat_mux_information_section 510. Table 11 is illustrative only, and in other variations, each pilot_pattern value may be associated with a different number of bits and different bit combination.

TABLE 11

| Description Satellite_profile = | | | |
|---|---|---|---|
| '01' | '10' | '00' or '11' | Pilot_pattern |
| 000 | | 000 | PP1 |
| 001 | | 001 | PP2 |
| 001 | | 001 | PP3 |
| 011 | | 011 | PP4 |
| 100 | | 100 | PP5 |
| | | 101 | PP6 |
| | | 110 | PP7 |
| 101 . . . 111 | | 111 | Reserved |

FIG. 5F illustrates another embodiment of sat_mux_information_section 512 where the MFN-OFDN profile is not utilized in the hybrid system. By eliminating the MFN-OFDN profile, the sat_mux_information_section 512 may be further reduced. The features of 512 are the same as in 508 and 510, except as follows.

In 512, satellite_profile may be a 1-bit field that indicates a transmission profile for the hybrid network system as shown in table 12. Table 12 is illustrative only, and in other variations, each satellite_profile value may be associated with a different number of bits and different bit combination.

TABLE 12

| satellite_profile | Description |
|---|---|
| 0 | SFN-OFDM |
| 1 | SFN-SC-OFDM |

The bandwidth parameter in 512 may be a 1-bit field that indicates, as shown in table 13, the bandwidth of the RF signal carrying the neighboring satellite multiplex. Table 13 is illustrative only, and in other variations, each bandwidth value may be associated with a different number of bits and different bit combination.

TABLE 13

| bandwidth | Description |
|---|---|
| 0 | 2.5 MHz |
| 1 | 5.0 MHz |

The FFT_size parameter field in 512 may include a 2-bit field that indicates, as shown in table 14, a fast Fourier transform configuration used in the satellite transmission. Table 14 is illustrative only, and in other variations, each FFT_size value may be associated with a different number of bits and different bit combination.

TABLE 14

| FFT_size | Description |
|---|---|
| 00 | 0.5 K |
| 01 | 1 K |
| 10 | 2 K |
| 11 | Reserved |

The guard_interval parameter field in 512 may include a 2-bit field that indicates a guard interval used in the transmission encoding (for example OFDM) used in the neighboring satellite transmission. Table 15 is illustrative only, and in other variations, each guard_interval value may be associated with a different number of bits and different bit combination.

TABLE 15

| guard_interval | Description |
|---|---|
| 00 | 1/32 |
| 01 | 1/16 |
| 10 | 1/8 |
| 11 | +HU1/4+L |

The pilot_pattern parameter field in 512 may include a 3-bit field that indicates a pilot pattern that is present for the specified satellite_profile. Table 16 is illustrative only, and in other variations, each pilot_pattern value may be associated with a different number of bits and different bit combination.

With respect to the pilot_pattern parameter, the sat_mux_information_section 512 includes a pseudocode conditional if-then statement that indicates whether the pilot_pattern parameter is present. If the satellite profile is '0' (i.e., SFN-OFDM), then the sat_mux_information_section may include a 3-bit pilot_pattern parameter that indicates a pilot_pattern as illustrated in table 16 below, and a 1 bit preamble_type parameter as illustrated in table 4 above. Table 16 is illustrative only, and in other variations, each pilot_pattern value may be associated with a different number of bits and different bit combination. If the satellite_profile is '1' (i.e., SFN-SC-OFDN), then the pilot_pattern parameter is not present in the sat_mux_information_section.

TABLE 16

| pilot_pattern | Description |
|---|---|
| 000 | PP1 |
| 001 | PP2 |
| 010 | PP3 |
| 011 | PP4 |
| 100 | PP5 |
| 101 . . . 111 | Reserved |

To locate the PLPs carrying data for consumption at an electronic device (for example, video and/or audio components of a service for viewing, playback, etc.), the electronic device may process signaling parameters included in FIGS. 5A-5F and service guide data.

Figure 6:
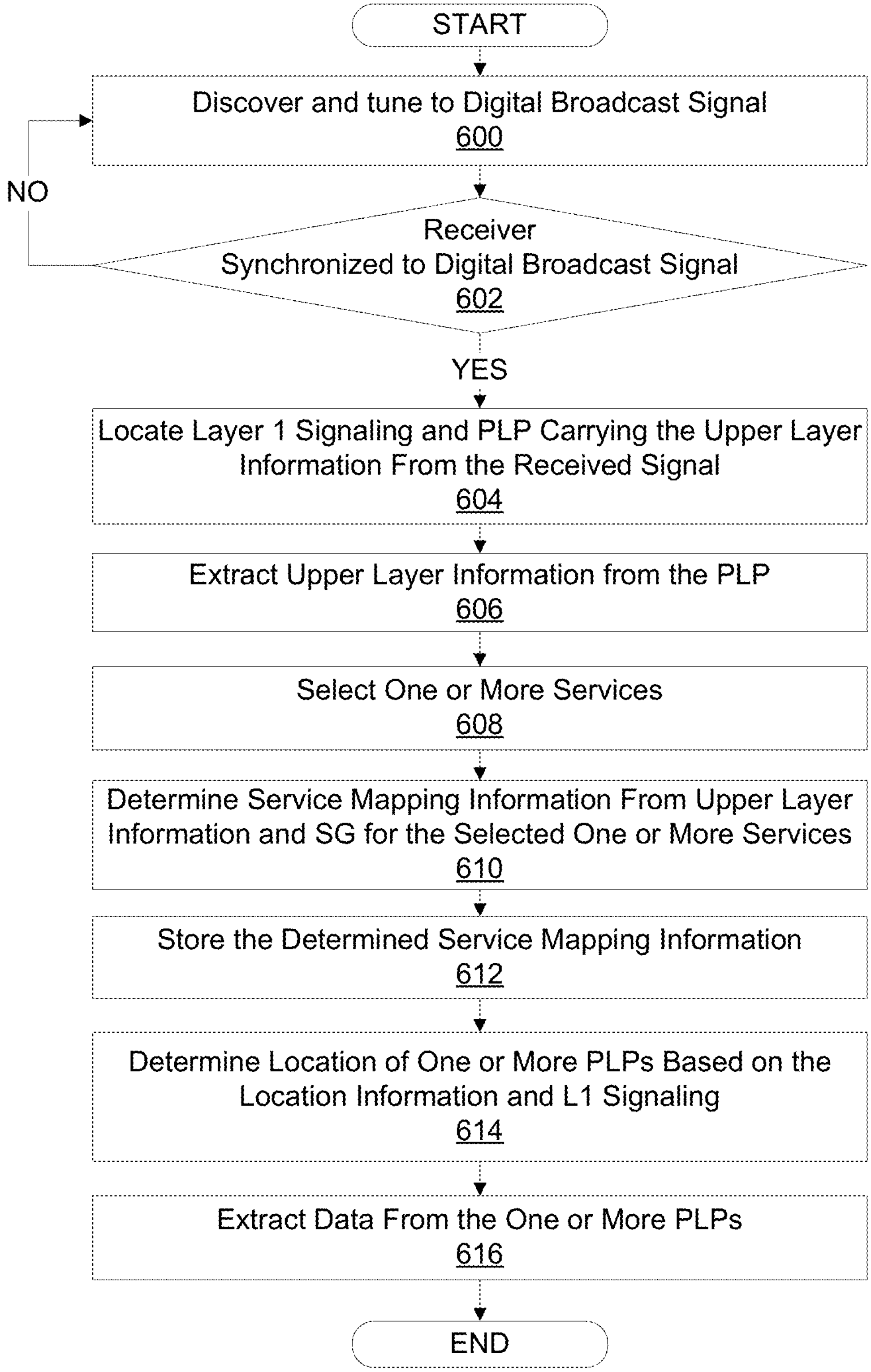
FIG. 6 illustrates an example method for processing layer 1 signaling and upper layer information according to one or more embodiments described herein.

FIG. 6 illustrates an example method for processing layer 1 signaling and upper layer information, which may be performed by apparatuses, for example, devices 105, 110, 112, 115, and 120. At steps 600 and 602, a broadcast signal (for example, a DVB-NGH signal) may be received, by first discovering and tuning to the broadcast signal in step 600, and then determining if the receiver is synchronized to the broadcast signal in step 602. In 602 for example, to discover the physical layer frames, a receiving device may tune to a P1 OFDM preamble symbol to synchronize the receiving device and to retrieve information for retrieving the remainder of the physical layer frame. In some variations, the physical layer frames may include two or more P1 or other preamble symbols that include data that may be correlated with each other to improve frame detection and synchronization. If the receiver is not synchronized, step 600 is repeated.

If the receiver gets synchronization, then at step 604, the layer 1 (L1) signaling and PLP carrying the upper layer information (ULI) may be located from the received signal. In some variations, receiving the ULI includes receiving the PLP carrying the service guide and extracting the ULI from the service guide. Upon locating the L1 signaling and the PLP carrying the ULI, the L1 signaling and ULI may be decoded from the signal. In some embodiments, the PLP carrying the upper layer information can be hard coded (e.g., a pre-determined PLP carries the ULI, etc.). In some embodiments, the PLP carrying the ULI may be signaled by a data parameter included in the signal, such as a PLP type parameter. The PLP carrying the ULI may contain additional signaling information.

At step 606, the ULI 407 may be extracted from the PLP carrying the ULI. In some instances, this may include separating the ULI from the additional signaling information included in the PLP carrying the ULI. In some variations, extracting the ULI includes receiving and extracting a service guide, and then extracting the ULI from the service guide data. Additionally, extracting the ULI may include decapsulating the ULI from IP packets and/or decoding the ULI. In some embodiments, the ULI may be located for extraction from the PLP carrying the ULI using one or more dedicated IP addresses and/or ports. Alternatively, the one or more IP addresses and/or ports of the ULI may be provided within dedicated bootstrap information. In some examples, such bootstrap information may be located at the beginning of the PLP carrying the ULI.

At step 608, one or more services (for example, the one or more desired services) may be selected. In one example, a service may be selected (for example, by a user of the receiving device via a user interface or autonomously by an application executed by the receiving device). A service identifier (e.g., a URI) for the selected service/components may then be discovered. For example, a receiver may analyze SG information, such as a SG table, stored at the receiver to identify a URI for a selected service.

At step 610, service-mapping information for the selected one or more services may be determined from the upper level information. For example, the upper level information (for example, service association section 502 of FIG. 5A) may be processed and/or decoded to determine the component parameters of the selected one or more services. In some embodiments, each desired service may be associated with one or more components respectively transporting audio data, video data, text data, etc. Each component may be associated with a URI, which may be previously identified from, for example, a service guide. Referring to the service_association section 502 of FIG. 5A, a matching URI for each component may be located in the service_association section 502 by locating a string of URI_bytes that match the desired URI. From the matched URI, mapping information associated with the component (and URI) can be determined. For example, the PLP_ID for the PLP carrying the component, the context_id, the context_profile, the static_chain_byte, and the MIMO_mode associated with the component may be determined.

Step 610 may also include, for each selected service, processing and/or decoding buffer information (for example, T_INT_APLF and BS_APLPF in ULI 407 in FIG. 5A).

At step 612, the determined mapping information (for example, the component parameters determined in step 610) may be stored (for example, in a memory of the receiving device) for later access.

At step 614, the location of one or more PLPs is determined based on the mapping information and L1 signaling. For example, the mapping information (for example, the buffer information and PLP_identifiers) and the L1 signaling (for example, the L1 signaling extracted and stored in the method illustrated by FIG. 6) may be used to identify the physical location of the PLP that corresponds to a component of the desired service(s). At step 616, upon locating the one or more PLPs, data of the desired service(s) from the one or more PLPs may be extracted and subsequently consumed (for example, processed for viewing, playback, etc.) at the receiving device (or transmitted to another terminal for consumption at the terminal).

In various embodiments, the receiving device may determine that a handover to a neighboring terrestrial cell or neighboring satellite coverage area is to be performed. In one example, the receiving device may initiate a handover from a first cell to a second cell. The receiver may attempt to continue receiving and/or consuming the selected service(s) currently being received and/or consumed by the receiving device. A handover procedure, in some embodiments, may include using information included in the neighboring multiplexes information (for example, NMI 504 of FIG. 5A).

Figure 7:
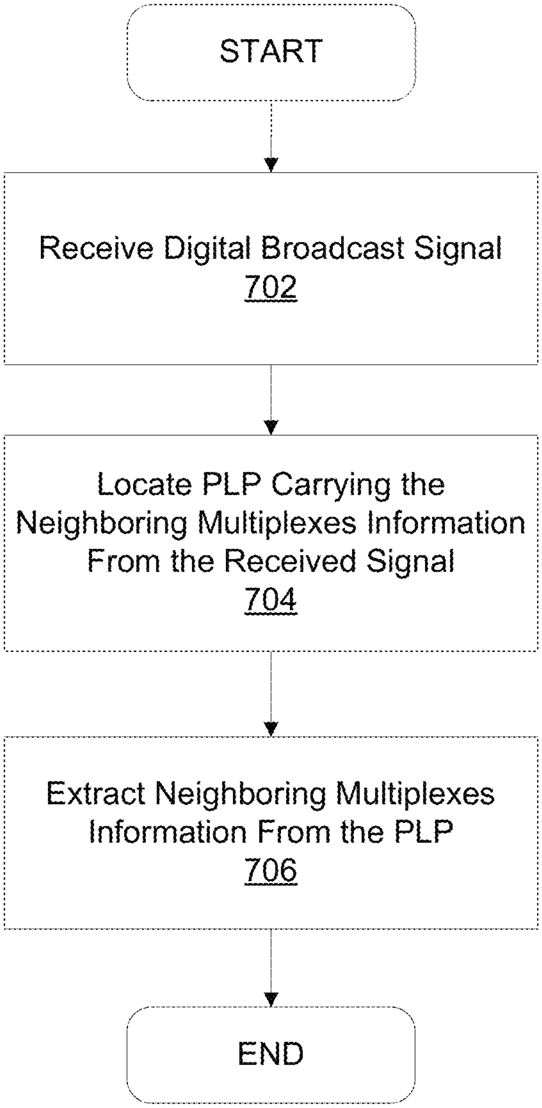
FIG. 7 illustrates an example method for processing upper layer multiplex information according to one or more embodiments described herein.

FIG. 7 illustrates an example method for processing neighboring multiplexes information, which may be performed by, for example, devices 105, 110, 112,115, and 120. At step 702, a digital broadcast signal (for example, a DVB-NGH signal) may be received. At step 704, the PLP carrying the neighboring multiplexes information (NMI) may be located from the received signal. Similar to the PLP carrying the ULI, the PLP carrying the NMI can be hard coded (e.g., a pre-determined PLP carries the NMI, etc.). In some embodiments, the PLP carrying the NMI may be signaled by a data parameter included in the signal, such as a PLP type parameter. The PLP carrying the NMI may contain additional signaling information. For example, the PLP carrying the ULI may also carry the NMI. The NMI may be separable from the additional signaling information based on IP layer information (for example, the ULI and the NMI may be provided using different IP addresses and/or ports).

At step 706, the NMI may be extracted from the PLP carrying the NMI. Similar to extraction of the ULI, in some instances, this can include separating the NMI from the additional signaling information included in the PLP carrying the NMI (for example, separating the NMI from the ULI). Additionally, extracting the NMI may include decapsulating the NMI from IP packets and/or decoding the NMI. Similar to the ULI, in some embodiments, the NMI may be provided using dedicated IP addresses and ports. Alternatively, the IP address and port of the NMI may be provided within dedicated bootstrap information. In some examples, such bootstrap information may be located at the beginning of the PLP carrying the NMI. In some embodiments, the NMI (e.g., NMI section 402) may be stored (e.g., in a memory of the receiving device) for later access.

In some variations, the NMI is encapsulated in a service guide and locating and extracting the NMI may include locating and extracting the service guide, and then extracting the NMI from the service guide data.

Figure 8:
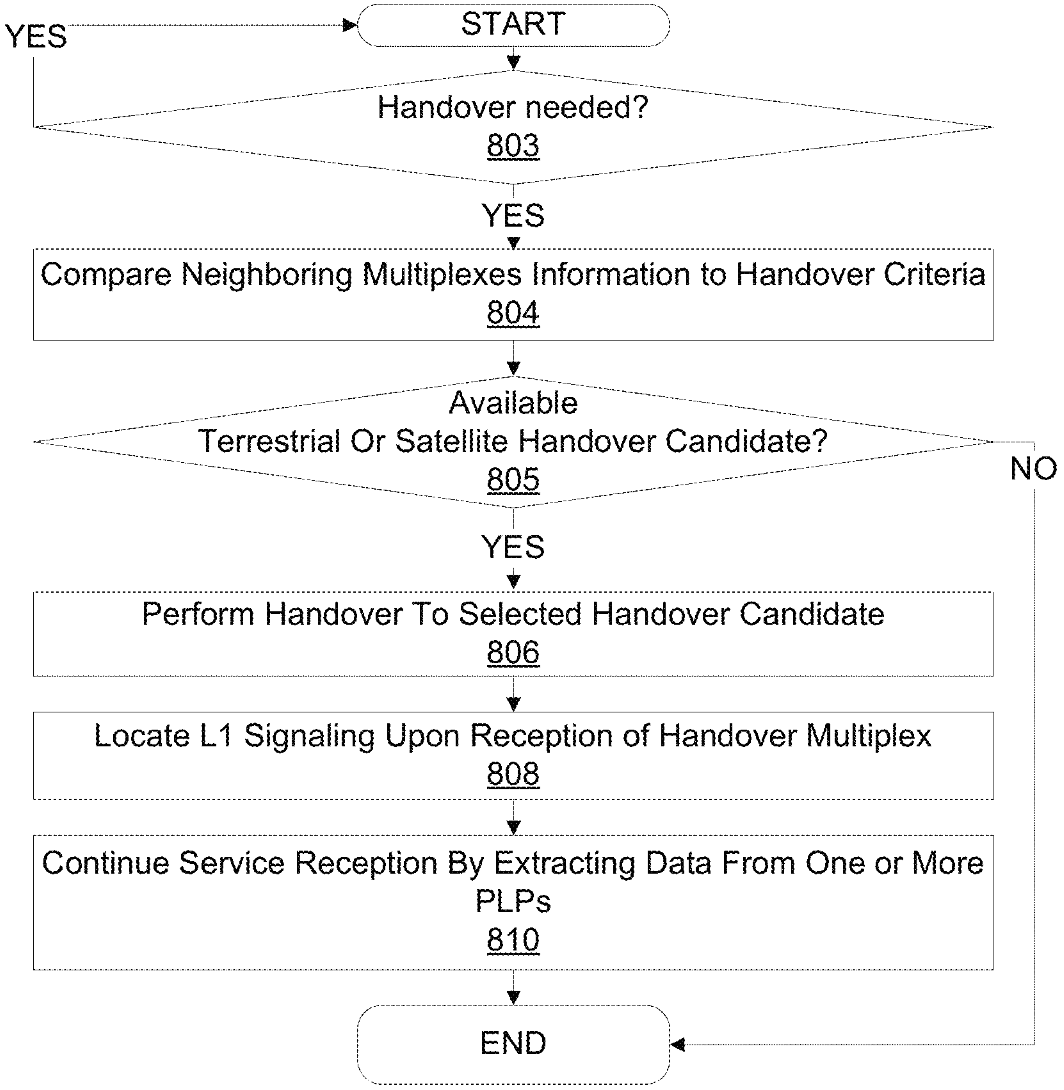
FIGS. 8-9 illustrate example methods for performing a handover according to one or more embodiments described herein.

FIG. 8 illustrates an example method for performing a handover, which may be performed by, for example, devices 105, 110, 112,115, and 120. At step 803, a determination may be made whether to initiate a handover. In some embodiments, a handover may be initiated based on one or more thresholds being reached, such as a signal strength threshold, a threshold number of data errors in decoding (for example, BCH or LPDC) occurs, P1 symbols are no longer detected in the current multiplex, etc. In one example, a handover may be initiated when the receiving device moves from a first cell to a second cell or coverage area of the network. If it is determined to initiate a handover, the handover may be initiated and the method may proceed to step 804. Otherwise, the method may return to the start and repeat.

At step 804, a handover has been initiated and the NMI may be compared to handover criteria. The NMI may list one or more (for example, some or all) services/components carried within the current multiplex (for example, the multiplex the receiving device is currently tuned to) and/or other multiplexes (for example, the multiplexes not currently tuned to, but available to the device, such as multiplexes of neighboring cells, neighboring satellite coverage areas, or other multiplexes of the current cell). In one example, each multiplex may be included in the NMI and may have a respective list of components that are carried within the multiplex. Components listed in the NMI may use the same component identifiers as the component identifiers found in the ULIs (for example, COMPONENT_IDs, URIs).

In some embodiments, the handover criteria may be that one or more services currently being received and/or consumed by the receiving device are included in a neighboring multiplex. Additionally and/or alternatively, the handover criteria may include one or more services recently received and/or consumed by the receiving device, and/or may include one or more services predicted to be received and/or consumed by the receiving device are included in a neighboring multiplex (for example, a prediction based on reception and/or consumption habits of a user at the receiving device). These services may be represented in the handover criteria by their component identifiers. Comparing the NMI to the handover criteria may include identifying one or more multiplexes of the NMI that include a listing of component identifiers that match the component identifiers of the handover criteria. In one instance, one or more multiplexes of the NMI may be identified by the comparison against handover criteria representing the services currently being received and/or consumed by the receiving device. In this instance, these identified multiplexes may carry the services currently being received and/or consumed by the receiving device.

In some embodiments, the comparison may compare the handover criteria to every multiplex included in the NMI. In others, the comparison may compare the handover criteria until a first matching multiplex is identified in the NMI. In yet others, the comparison may compare the handover criteria until a threshold number (for example, 2, 3, 4, etc.) of matching multiplexes are identified in the NMI. Additionally, the information for the identified matching multiplexes may be extracted from the NMI and/or stored for later access. For example, referring to FIGS. 5B-5F, the various parameters associated with a particular matching multiplex may be extracted and/or stored.

Referring again to FIG. 8, at step 805, a determination is made whether there are any available terrestrial or satellite handover candidate multiplexes. For example, if one or more multiplexes in neighboring cell or satellite coverage are identified in the NMI that match the handover criteria (for example, there is at least one multiplex in the NMI that carries the services currently being received and/or consumed by the receiving device), it may be determined that there are available handover candidates. The process may then proceed to step 806. Otherwise, the process may end and/or announce (for example, present an indicator on a display, illuminate a lamp, produce a sound, etc.) that there are not any available candidates. Such an announcement may include announcing that handover is not possible and/or that service disruption would result if handover were attempted.

At step 806, the handover to an available handover candidate multiplex is performed. The handover may include selecting a handover multiplex from the available handover candidate multiplexes and starting reception of the handover multiplex. In some instances, the handover multiplex may be a different frequency than the current multiplex (for example, in a system having an MFN-OFDM profile). Determining the frequency and other information required to receive the new multiplex may be based on the neighboring multiplex information previously received in the current multiplex before handover.

Handover may include, for example, tuning to a P1 OFDM preamble symbol in the new multiplex to synchronize the receiving device and to retrieve information for retrieving the remainder of the physical layer frame. In some variations, the physical layer frames may include one or more P1 or other preamble symbols that include data that may be correlated with each other to improve frame detection and synchronization. Using the preamble_type field in the neighboring signaling information to determine how many P1 symbols there are in the new multiplex may improve or reduce synchronization time to the new multiplex.

Selecting the handover multiplex may be performed in various ways, including, for example: selecting the first available candidate multiplex; selecting based on multiplex priority (for example, multiplexes having certain parameter and/or identifier values, such as network identifier and/or cell identifier, may be given priority over other multiplexes having different parameter/identifier values); and/or selecting based on other criteria (for example, signal strength of the available multiplexes). The handover may be performed using the information of the selected handover multiplex that was extracted from the NMI (for example, the parameters and/or identifiers extracted from NMI section 504 of FIG. 5B). For example, a frame offset parameter may be used when starting the reception of a frame (for example, a DVB-NGH frame) carried by the new multiplex. Use of the frame_synch_offset may, for example, enable the correct timing and/or prevent delay of the frame synchronization.

At step 808, upon reception of a signal of the handover multiplex, the L1 signaling is located. The L1 signaling may then be extracted for use by the receiving device. In conjunction with the information for the handover multiplex extracted from the NMI (for example, component identifiers, PLP identifiers, etc.), the L1 signaling may provide the receiving device the information needed to locate and extract information from PLPs carrying the data for the desired services. In some embodiments, the receiving device may proceed immediately with locating and extracting information from the PLPs carrying the data for the desired services so that the receiving device may continue receiving and/or consuming the desired services. For example, there may be no need to locate and process ULI information (for example, in a system having a SFN-OFDN or SFN-SC-OFDN profile), and those processes for extracting and processing the ULI may be skipped and/or not performed.

At step 810, reception of the desired services may be continued by extracting data from one or more PLPs of the desired service from the received signal of the handover multiplex. Extracting the data may include locating the one or more PLPs using the L1 signaling located in step 808 and the information of the handover multiplex extracted from the NMI. For example, the one or more PLPs may be located (for example, the physical location of the one or more PLPs may be determined) based on the L1 signaling, the component identifiers of the handover multiplex, and the PLP identifiers of the handover multiplex.

Figure 9:
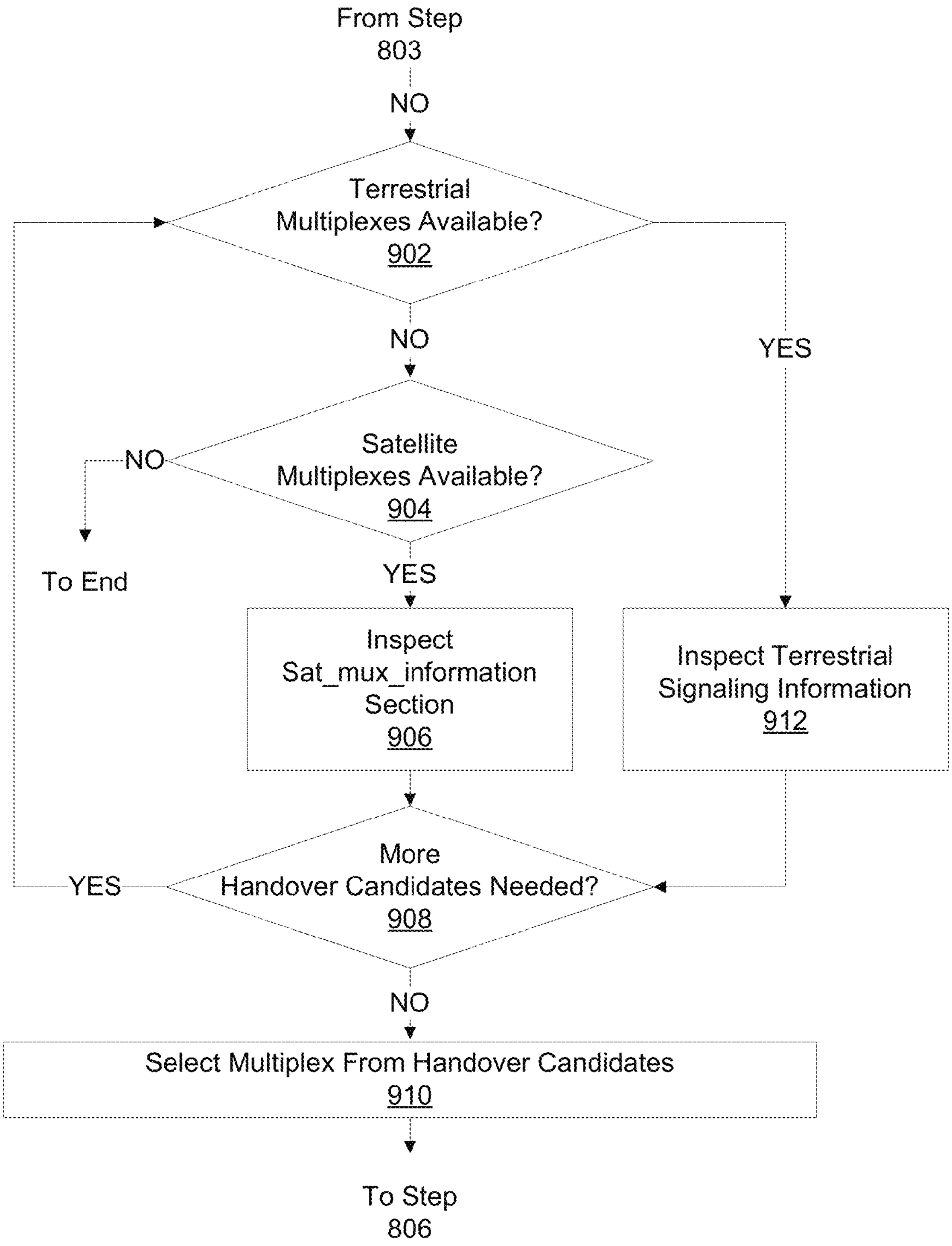

FIG. 9 illustrates an example method that may be used in place of steps 804 and 805 in FIG. 8 for identifying available neighboring terrestrial and satellite multiplexes. After determining that a handover is needed in step 803 of FIG. 8, the process proceeds to step 902 where the availability of a terrestrial multiplex in neighboring cell is determined, or, for example, whether a switch to a satellite multiplex is necessary. In some variations, handover to a terrestrial cell may be preferred over a handover to a neighboring satellite multiplex. Determining whether a terrestrial multiplex is available may be performed in a number of ways, including, for example, studying the latest received mux_information_section carried in the NMI, and/or performing a signal scan to detect the neighboring terrestrial multiplexes.

If a neighboring terrestrial multiplex is available, the process proceeds to step 912, where the signaling information for the detected multiplex is examined to confirm the multiplexes availability and requirements for handover. The inspected signaling information may be stored in a memory for later analysis. Subsequently, the process proceeds to step 908 where a determination is made of whether further candidate multiplexes are needed or desired. For example, a device performing the process may be configured to find all available terrestrial and/or satellite neighboring candidate multiplexes so that the requirements for handover and other performance criteria may be compared. If more are desired, the process returns to step 902.

In step 902, if no further terrestrial multiplexes are available, the process proceeds to step 904, where the presence of neighboring satellite multiplexes are checked for availability. Determining whether a satellite multiplex is available may be performed in a number of ways, including, for example, determining if a sat_mux_information_section has been received in the NMI or is available, and/or performing a signal scan to detect the neighboring satellite multiplex. If a neighboring satellite multiplex is available, the process proceeds to step 906, where the signaling information for the detected satellite multiplex is examined to confirm the multiplexes availability and the requirements for handover. The inspected satellite signaling information may be stored in a memory for later analysis. Subsequently, the process proceeds to step 908.

In step 908, when no more candidate multiplexes are needed or available, the process proceeds to step 910, where one of the candidate multiplexes is selected for handover based on the stored signaling information for each multiplex, and based on one or more selection criteria. Selection criteria may include a determination of geographical proximity of the neighboring cell or satellite coverage area, total area of the neighboring cell or satellite coverage area, reception requirement compatibility with the receiving device, power requirements for receiving each neighboring multiplex, data throughput capability of each neighboring multiplex, cost, and/or fees for using each neighboring multiplex, etc. Once a multiplex is selected for handover, the process returns to step 806 in FIG. 8.

Figure 10:
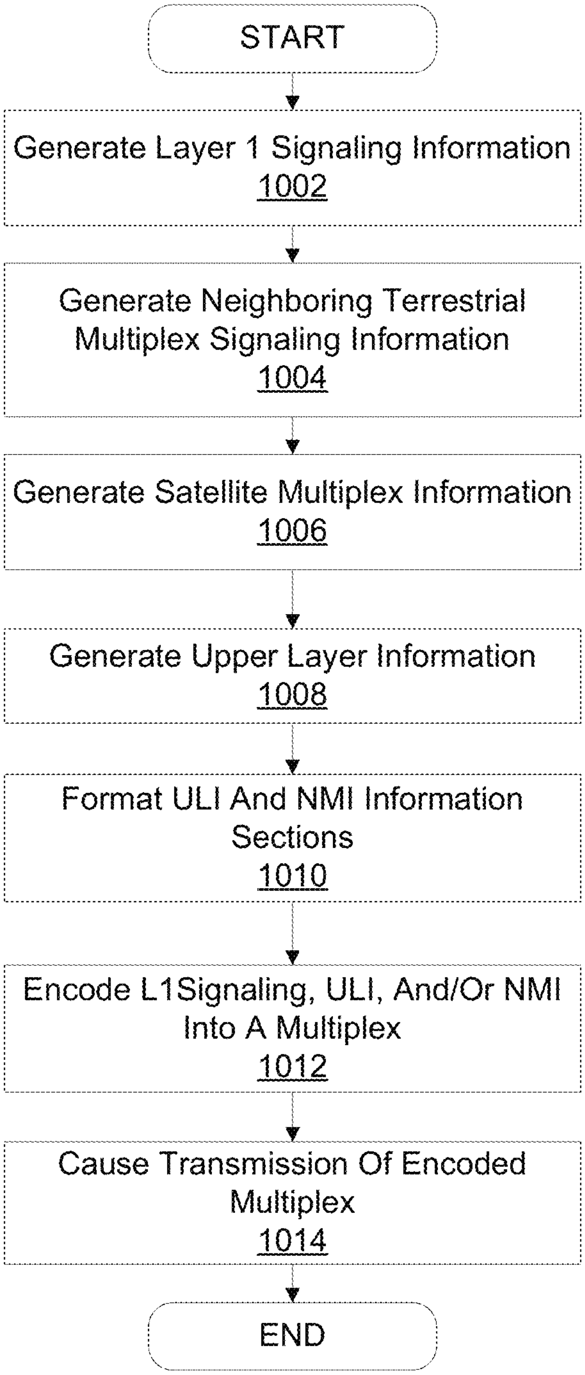
FIG. 10 illustrates an example method for communicating signaling parameters according to one or more embodiments described herein.

FIG. 10 illustrates an example method for generating and communicating signaling parameters, which may be performed by, for example, service provider 125, content provider/server 130, digital content sources 104, and digital broadcast transmitter 103. The example method of FIG. 10 may be implemented, for example, by a processor or other circuitry, in one or more various devices and apparatuses of a content provider and/or a service provider (for example, service provider 125 of FIG. 1A, content provider server 130 of FIG. 1A, digital content sources 104 of FIG. 1B, digital broadcast transmitter 103 of FIG. 1B, transmitter 101 of FIG. 1B, etc.). These various devices and apparatuses may include at least one processor and at least one memory. Additionally, the various devices and apparatuses may include receiving and/or transmitting circuitry and hardware interfaces for the transmitting and receiving of signals from the devices and apparatuses as, for example, disclosed in FIG. 2. At step 1002, L1 parameters may be generated that associates indexes, such as a PLP identifier, with a physical location. At step 1004, neighboring terrestrial multiplex signaling information, such as the information in FIG. 5B and FIG. 5C may be generated. At step 1006, neighboring satellite multiplex information, such as the information in FIGS. 5B and 5D-5F may be generated. The information generated in 1004 and 1006 may include information for performing a handover to available multiplexes.

At step 1008, upper layer information is generated that associates a uniform resource identifier with one or more component identifiers (for example, information represented by the structure of service_association section 502 of FIG. 5A is generated).

In step 1010, the ULI and/or the NMI are formatted as described above. Step 1010 may include formatting a service guide according to OMA BCAST ESG or other standard and embedding the ULI and NMI within the service guide data.

At step 1012 the formatted L1 signalling, ULI and/or NMI are encoded into a multiplex having one or more PLPs. In one variation, the encoded multiplex may be configured for transmission from a terrestrial based transmitter, such as a transmitter covering a terrestrial cell as illustrated in FIG. 1C In another variation, the encoded multiplex may be configured for transmission from a satellite, such as a satellite covering a satellite coverage area as illustrated in FIG. 1C.

At step 1014, transmission of encoded multiplex including the L1 signaling information, the NMI, and the ULI to a receiving device is caused to occur (for example, the generated information is sent to a transmitter and/or transmitter antenna for transmission).

Any of the method steps, operations, procedures or functions described herein may be implemented using one or more processors and/or one or more memory in combination with executable instructions that cause the processors and other components to perform the method steps, procedures or functions. For example, service provider 125, content provider/server 130, digital content sources 104, digital broadcast transmitter 103, antenna 101, satellite transceiver/dish 106, satellite 107, and client devices (for example, devices 105, 110, 115, 120, and 112) may each include one or more processors and/or one or more memory in combination with executable instructions that cause each device/system to perform operations as described herein. As used herein, the terms "processor"/"controller" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

The methods and features recited herein may further be implemented through any number of machine-readable media that are able to store machine executable instructions. Examples of machine readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may be, for example, a microprocessor that accesses machine executable instructions or other data stored in a read only memory (ROM). In some such embodiments, the ROM stores machine executable instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of machine executable instructions read from ROM or RAM, with other operations hardwired into gates and other logic of IC. Further, the IC may output image data to a display buffer.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device A processor and memory may comprise but are not limited to (1) one or more microprocessors, (2) one or more processor(s) with accompanying digital signal processor(s), (3) one or more processor(s) without accompanying digital signal processor(s), (4) one or more special-purpose computer chips, (5) one or more field-programmable gate arrays (FPGAS), (6) one or more controllers, (7) one or more application-specific integrated circuits (ASICS), or (8) one or more computer(s). The description should also note, among other things, that the relevant structure may include one or more memories (e.g., RAM, ROM, CD-ROM, etc.) and that the relevant structure/hardware has been programmed in such a way to carry out the inventive function.

Numerous other embodiments, modifications, and variations within the scope and spirit of the appended claims will occur to persons of ordinary skill in the art from a review of this disclosure and be recognized as being within the scope of the invention.

Although specific examples of carrying out the invention have been described, those skilled in the art will appreciate that there are numerous variations and permutations of the above-described systems and methods that are contained within the spirit and scope of the invention as set forth in the appended claims.

We claim:

1. A method comprising:

receiving, at a computing device from a terrestrial transmitter, a digital broadcast multiplex;

extracting signaling information from a physical layer pipe in the digital broadcast multiplex;

decoding network profile information in the signaling information, the network profile information indicating, when a first value, that one or more neighboring satellites transmitting one or more neighboring satellite multiplexes and one or more neighboring terrestrial transmitters transmitting one or more neighboring terrestrial multiplexes form a single-frequency network, and the network profile information indicating, when a second value, that the one or more neighboring satellites and the one or more neighboring terrestrial transmitters form a multi-frequency network; and storing data related to the network profile information.

2. The method of claim 1, wherein the signaling information includes broadcast protocol signaling information for the one or more neighboring satellite multiplexes and broadcast protocol signaling information for the one or more neighboring terrestrial multiplexes, the method further comprising:

extracting the broadcast protocol signaling information for at least one of the one or more neighboring terrestrial multiplexes and the broadcast protocol signaling information for at least one of the one or more neighboring satellite multiplexes from the physical layer pipe; and selecting a neighboring multiplex for handover from the at least one of the one or more neighboring terrestrial multiplexes and the at least one of the one or more neighboring satellite multiplexes.

3. The method of claim 1, further comprising:

decoding additional network profile information in the signaling information, the additional network profile information indicating, when a third value, that the one or more neighboring satellite multiplexes and the one or more neighboring terrestrial multiplexes are transmitted using orthogonal frequency division multiplex encoding, and the additional network profile information indicating, when a forth value, that the one or more neighboring satellite multiplexes and the one or more neighboring terrestrial multiplexes are transmitted using single carrier orthogonal frequency division multiplex encoding.

4. The method of claim 1, further comprising:

decoding, in the signaling information, preamble information for a first neighboring satellite multiplex of the one or more neighboring satellite multiplexes, the preamble information indicating, when a third value, that transmission frames in the first neighboring satellite multiplex include a single preamble symbol, and the preamble information indicating, when a forth value, that the transmission frames in the first neighboring satellite multiplex include two preamble symbols.

5. An apparatus comprising:

at least one processor; and at least one memory storing computer program code, the at least one memory and computer program code configured to, with the at least one processor, cause the apparatus at least to:

receive, from a terrestrial transmitter, a digital broadcast multiplex;

extract signaling information from a physical layer pipe in the digital broadcast multiplex;

decode network profile information in the signaling information, the network profile information indicating, when a first value, that one or more neighboring satellites transmitting one or more neighboring satellite multiplexes and one or more neighboring terrestrial transmitters transmitting one or more neighboring terrestrial multiplexes form a single-frequency network, and the network profile information indicating, when a second value, that the one or more neighboring satellites and the one or more neighboring terrestrial transmitters form a multi-frequency network; and store data related to the network profile information.

6. The apparatus of claim 5, wherein the signaling information includes broadcast protocol signaling information for the one or more neighboring satellite multiplexes and broadcast protocol signaling information for the one or more neighboring terrestrial multiplexes, and wherein the at least one memory and the computer program code are further configured to, with the at least one processor, cause the apparatus at least to:

extract the broadcast protocol signaling information for at least one of the one or more neighboring terrestrial multiplexes and the broadcast protocol signaling information for at least one of the one or more neighboring satellite multiplexes from the physical layer pipe; and select a neighboring multiplex for handover from the at least one of the one or more neighboring terrestrial multiplexes and the at least one of the one or more neighboring satellite multiplexes.

7. The apparatus of claim 5, wherein the at least one memory and the computer program code are further configured to, with the at least one processor, cause the apparatus at least to:

decode additional network profile information in the signaling information, the additional network profile information indicating, when a third value, that the one or more neighboring satellite multiplexes and the one or more neighboring terrestrial multiplexes are transmitted using orthogonal frequency division multiplex encoding, and the additional network profile information indicating, when a forth value, that the one or more neighboring satellite multiplexes and the one or more neighboring terrestrial multiplexes are transmitted using single carrier orthogonal frequency division multiplex encoding.

8. The apparatus of claim 5, wherein the at least one memory and the computer program code are further configured to, with the at least one processor, cause the apparatus at least to:

decode, in the signaling information, preamble information for a first neighboring satellite multiplex of the one or more neighboring satellite multiplexes, the preamble information indicating, when a third value, that transmission frames in the first neighboring satellite multiplex include a single preamble symbol, and the preamble information indicating, when a forth value, that the transmission frames in the first neighboring satellite multiplex include two preamble symbols.

9. A method comprising:

encoding a digital broadcast multiplex configured for transmission from a terrestrial transmitter, the digital broadcast multiplex encoded to include one or more physical layer pipes having signaling information including network profile information, the network profile information indicating, when a first value, that one or more neighboring satellites transmitting one or more neighboring satellite multiplexes and one or more neighboring terrestrial transmitters transmitting one or more neighboring terrestrial multiplexes form a single-frequency network, and the network profile information indicating, when a second value, that the one or more neighboring satellites and the one or more neighboring terrestrial transmitters form a multi-frequency network; and causing the digital broadcast multiplex to be transmitted from the terrestrial transmitter.

10. The method of claim 9, further comprising:

encoding the digital broadcast multiplex to include, in the one or more physical layer pipes, broadcast protocol signaling information for the one or more neighboring satellite multiplexes and broadcast protocol signaling information for the one or more neighboring terrestrial multiplexes.

11. The method of claim 9, further comprising:

encoding the digital broadcast multiplex to include additional network profile information in the signaling information, the additional network profile information indicating, when a third value, that the one or more neighboring satellite multiplexes and the one or more neighboring terrestrial multiplexes are transmitted using orthogonal frequency division multiplex encoding, and the additional network profile information indicating, when a forth value, that the one or more neighboring satellite multiplexes and the one or more neighboring terrestrial multiplexes are transmitted using single carrier orthogonal frequency division multiplex encoding.

12. The method of claim 9, further comprising:

encoding the digital broadcast multiplex to include, in the signaling information, preamble information for a first neighboring satellite multiplex of the one or more neighboring satellite multiplexes, the preamble information indicating, when a third value, that transmission frames in the first neighboring satellite multiplex include a single preamble symbol, and the preamble information indicating, when a forth value, that the transmission frames in the first neighboring satellite multiplex include two preamble symbols.

13. An apparatus comprising:

at least one processor; and at least one memory storing computer program code, the at least one memory and computer program code configured to, with the at least one processor, cause the apparatus at least to:

encode a digital broadcast multiplex configured for transmission from a terrestrial transmitter, the digital broadcast multiplex encoded to include one or more physical layer pipes having signaling information including network profile information, the network profile information indicating, when a first value, that one or more neighboring satellites transmitting one or more neighboring satellite multiplexes and one or more neighboring terrestrial transmitters transmitting one or more neighboring terrestrial multiplexes form a single-frequency network, and the network profile information indicating, when a second value, that the one or more neighboring satellites and the one or more neighboring terrestrial transmitters form a multi-frequency network; and cause the digital broadcast multiplex to be transmitted from the terrestrial transmitter.

14. The apparatus of claim 13, wherein the at least one memory and the computer program code are further configured to, with the at least one processor, cause the apparatus at least to:

encode the digital broadcast multiplex to include, in the one or more physical layer pipes, broadcast protocol signaling information for the one or more neighboring satellite multiplexes and broadcast protocol signaling information for the one or more neighboring terrestrial multiplexes.

15. The apparatus of claim 13, wherein the at least one memory and the computer program code are further configured to, with the at least one processor, cause the apparatus at least to:

encode the digital broadcast multiplex to include additional network profile information in the signaling information, the additional network profile information indicating, when a third value, that the one or more neighboring satellite multiplexes and the one or more neighboring terrestrial multiplexes are transmitted using orthogonal frequency division multiplex encoding, and the additional network profile information indicating, when a forth value, that the one or more neighboring satellite multiplexes and the one or more neighboring terrestrial multiplexes are transmitted using single carrier orthogonal frequency division multiplex encoding.

16. The apparatus of claim 13, wherein the at least one memory and the computer program code are further configured to, with the at least one processor, cause the apparatus at least to:

encode the digital broadcast multiplex to include, in the signaling information, preamble information for a first neighboring satellite multiplex of the one or more neighboring satellite multiplexes, the preamble information indicating, when a third value, that transmission frames in the first neighboring satellite multiplex include a single preamble symbol, and the preamble information indicating, when a forth value, that the transmission frames in the first neighboring satellite multiplex include two preamble symbols.

* * * * *